US011889229B2

(12) United States Patent
Garrido et al.

(10) Patent No.: US 11,889,229 B2
(45) Date of Patent: Jan. 30, 2024

(54) MODIFYING VIDEO STREAMS WITH SUPPLEMENTAL CONTENT FOR VIDEO CONFERENCING

(71) Applicant: Apple Inc., Cupertino, CA (US)

(72) Inventors: Christopher M. Garrido, San Jose, CA (US); Eric L. Chien, Santa Clara, CA (US); Austin W. Shyu, San Diego, CA (US); Ming Jin, Saratoga, CA (US); Yan Yang, San Jose, CA (US); Ian J. Baird, San Jose, CA (US); Joe S. Abuan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/867,466

(22) Filed: May 5, 2020

(65) Prior Publication Data

US 2020/0267349 A1    Aug. 20, 2020

Related U.S. Application Data

(63) Continuation of application No. 16/151,244, filed on Oct. 3, 2018, now Pat. No. 10,681,310.
(Continued)

(51) Int. Cl.
*H04N 7/15* (2006.01)
*H04L 51/10* (2022.01)
(Continued)

(52) U.S. Cl.
CPC ......... *H04N 7/152* (2013.01); *G06F 3/04845* (2013.01); *G06V 40/166* (2022.01);
(Continued)

(58) Field of Classification Search
None
See application file for complete search history.

(56) References Cited

U.S. PATENT DOCUMENTS

| 7,227,976 B1 | 6/2007 | Jung |
| 8,099,462 B2 | 1/2012 | Sheng |

(Continued)

FOREIGN PATENT DOCUMENTS

| CN | 1901665 A | 1/2007 |
| CN | 101018314 | 8/2007 |

(Continued)

OTHER PUBLICATIONS

Written Opinion from PCT PCT/US2019/022340, dated Jul. 23, 2020, 12 pages.
(Continued)

*Primary Examiner* — Stella L. Woo
(74) *Attorney, Agent, or Firm* — BAKERHOSTETLER

(57) ABSTRACT

The subject technology provides a video conferencing application in which a live incoming or outgoing video stream can be supplemented with supplemental content, such as stickers, animations, etc., from within the video conferencing application. In this manner, a user participating in a video conferencing session with a remote user can add stickers, animations, and/or adaptive content to an outgoing video stream being captured by the device of the user, or to an incoming video stream from the device of the remote user, without having to locally cache/store a video clip before editing, and without having to leave the video conferencing session (or the video conferencing application) to access a video editing application.

25 Claims, 16 Drawing Sheets

Related U.S. Application Data

(60) Provisional application No. 62/668,126, filed on May 7, 2018.

(51) Int. Cl.
  *G06F 3/04845* (2022.01)
  *H04M 1/72439* (2021.01)
  *G06V 40/16* (2022.01)
  *H04L 51/043* (2022.01)
  *H04L 51/046* (2022.01)

(52) U.S. Cl.
  CPC .......... *H04L 51/043* (2013.01); *H04L 51/046* (2013.01); *H04L 51/10* (2013.01); *H04M 1/72439* (2021.01)

(56) References Cited

U.S. PATENT DOCUMENTS

| | | | |
|---|---|---|---|
| 9,088,426 | B2 | 7/2015 | Vivekanandan et al. |
| 9,088,697 | B2 | 7/2015 | Vivekanandan et al. |
| 9,519,396 | B2 | 12/2016 | Goossens |
| 9,787,945 | B2 | 10/2017 | Segal et al. |
| 9,813,642 | B1 | 11/2017 | Chen |
| 9,818,224 | B1 | 11/2017 | Worley |
| 10,057,731 | B2 | 8/2018 | Grossman et al. |
| 10,270,983 | B1 | 4/2019 | Van Os |
| 10,681,310 | B2* | 6/2020 | Garrido ............... H04L 51/043 |
| 2004/0125423 | A1 | 7/2004 | Nishi |
| 2007/0216675 | A1* | 9/2007 | Sun ..................... G06T 11/00 345/419 |
| 2008/0136895 | A1 | 6/2008 | Mareachen |
| 2009/0271705 | A1 | 10/2009 | Sheng et al. |
| 2010/0079491 | A1 | 4/2010 | Nonaka |
| 2011/0279639 | A1 | 11/2011 | Anand et al. |
| 2012/0069028 | A1* | 3/2012 | Bouguerra ............ H04L 51/046 345/473 |
| 2012/0206558 | A1 | 8/2012 | Setton |
| 2013/0177240 | A1 | 7/2013 | Thoma |
| 2013/0215774 | A1 | 8/2013 | Bender |
| 2013/0235045 | A1 | 9/2013 | Corazza |
| 2013/0242031 | A1* | 9/2013 | Petterson .............. H04N 7/157 348/14.07 |
| 2014/0002578 | A1 | 1/2014 | Rosenberg |
| 2014/0075335 | A1 | 3/2014 | Hicks |
| 2014/0139609 | A1 | 5/2014 | Lu et al. |
| 2014/0267544 | A1 | 9/2014 | Li et al. |
| 2014/0361974 | A1* | 12/2014 | Li ......................... G06F 3/017 345/156 |
| 2014/0376785 | A1* | 12/2014 | Bathiche .............. G06V 40/168 382/118 |
| 2015/0172238 | A1 | 6/2015 | Ahmed et al. |
| 2015/0189355 | A1* | 7/2015 | Korbecki ........... H04N 21/44008 725/12 |
| 2015/0365627 | A1 | 12/2015 | Deng et al. |
| 2016/0073055 | A1 | 3/2016 | Marsh |
| 2016/0088078 | A1 | 3/2016 | Wang |
| 2016/0191958 | A1* | 6/2016 | Nauseef ............ H04N 21/8153 725/116 |
| 2017/0034237 | A1 | 2/2017 | Silver |
| 2017/0171280 | A1 | 6/2017 | Kim |
| 2017/0243403 | A1 | 8/2017 | Daniels |
| 2017/0287443 | A1* | 10/2017 | Boyce .................. G09G 5/006 |
| 2017/0332044 | A1 | 11/2017 | Marlow et al. |
| 2018/0167559 | A1* | 6/2018 | Kraft .................... G06T 11/00 |
| 2018/0182141 | A1* | 6/2018 | Caballero ............. G06T 11/00 |
| 2018/0190322 | A1 | 7/2018 | Zukeman |
| 2022/0070385 | A1* | 3/2022 | Van Os ................ H04N 5/275 |

FOREIGN PATENT DOCUMENTS

| | | |
|---|---|---|
| CN | 101051392 | 10/2007 |
| CN | 101072301 | 11/2007 |
| CN | 103828350 | 5/2014 |
| CN | 104284131 | 1/2015 |
| CN | 104780339 | 7/2015 |
| CN | 105187724 | 12/2015 |
| CN | 105357466 | 2/2016 |
| CN | 107483833 | 12/2017 |
| CN | 107911643 | 4/2018 |
| EP | 2887686 | 6/2015 |
| JP | 2003-016475 A | 1/2003 |
| JP | 2005-130356 A | 5/2005 |
| JP | 2005-277989 A | 10/2005 |
| JP | 2006-185393 A | 7/2006 |
| JP | 2010-239393 A | 10/2010 |
| JP | 2014-532330 | 12/2014 |
| KR | 2013-0022434 | 3/2013 |
| WO | WO 2013/012576 | 1/2013 |
| WO | WO 2013/152455 | 10/2013 |
| WO | WO 2016/039835 | 3/2016 |
| WO | WO 2017/059524 | 4/2016 |

OTHER PUBLICATIONS

International Preliminary Report on Patentability from PCT/US2019/022340, dated Sep. 9, 2020, 23 pages.
Betters, "Facebook Messenger: Here's how to use those new Snapchat-like lenses," Dec. 2016, downloaded from https://www.pocket-lint.com/apps/news/facebook/139756/facebook-messenger-here-s-how-to-use-those-new-snapchat-like-lenses.
"Insta Emoji Photo Editor," downloaded on Sep. 20, 2018 from https://itunes.apple.com/us/app/insta-emoji-photo-editor/id644680748?mt=8, 3 pages.
Constine, "Snapchat Acquires Looksery to Power Its Animated Lenses," Sep. 15, 2015, retrieved from https://techcrunch.com/2015/09/18/snapchat-looksery/2015/09/18/snapchat-looksery/, 7 pages.
Eadiccicco, "You Can Now Add Stickers to Instagram Posts," Dec. 20, 2016, downloaded from http://time.com/4607776/instagram-stickers-feature-2016/, 1 page.
Gartenberg, "How to use Snapchat in 2017," May 27, 2017, retrieved from https://www.theverge.com/2017/5/27/15667268/how-to-use-snapchat-guide-messages-snap-video-2017, 7 pages.
Kaser, "Your complete guide to Snapchat: Snap, filter, and roll," Oct. 8, 2017, retrieved from https://thenextweb.com/apps/2017/10/08/complete-guide-to-snapchat-snap-filter-roll/, 24 pages.
Yarow, "Snapchat: We've turned over a dozen unopened snaps to law enforcement," Oct. 14, 2013, retrieved from https://businessinsider.com/snapchat-weve-turned-over-a-dozen-unopened-snaps-to-law-enforcement-2013-10, 14 pages.
International Search Report and Written Opinion from PCT/US2019/022103, dated May 27, 2019, 16 pages.
International Search Report and Written Opinion from PCT/US2019/022340, dated Jun. 26, 2019, 28 pages.
Taiwanese Office Action from Taiwanese Patent Application No. 108113738, dated Dec. 9, 2019, 29 pages including English language translation.
Australian Office Action from Australian Patent Application No. 2019266045, dated Apr. 27, 2021, 3 pages.
Written Opinion of the International Preliminary Examining Authority from PCT/US2019/022103, dated Aug. 27, 2020, 8 pages.
Korean Office Action from Korean Patent Application No. 10-2020-7032253, dated Oct. 7, 2021, 12 pages including English language translation.
Chinese Office Action from Chinese Patent Application No. 201980024341.3, dated Nov. 25, 2021, 26 pages including machine-generated English language translation.
Japanese Office Action from Japanese Patent Application No. 2020-562621, dated Jan. 14, 2022, 11 pages including English language translation.
Australian Notice of Acceptance from Australian Patent Application No. 2019266045, dated Jan. 20, 2022, 3 pages.
Korean Office Action from Korean Patent Application No. 10-2020-7032253, dated Apr. 27, 2022, 7 pages including English language summary.
Chinese Office Action from Chinese Patent Application No. 201980024341.3, dated Apr. 18, 2022, 17 pages including English language summary.

(56) References Cited

OTHER PUBLICATIONS

Chinese Office Action from Chinese Patent Application No. 201980024441.6, dated Apr. 18, 2022, 15 pages including English language summary.

Chinese Office Action from Chinese Patent Application No. 201980024441.6, dated Aug. 12, 2022, 16 pages including English language summary.

Japanese Notice of Allowance from Japanese Patent Application No. 2020-562621, dated Jul. 29, 2022, 5 pages including English language translation.

Korean Office Action from Korean Patent Application No. 10-2020-7032253, dated Oct. 28, 2022, 6 pages including English language translation.

Chinese Office Action from Chinese Patent Application No. 201980024441.6, dated Feb. 24, 2023, 19 pages including English language summary.

European Office Action from European Patent Application No. 19716622.6, dated Dec. 19, 2022, 4 pages.

Korean Notice of Allowance from Korean Patent Application No. 10-2020-7032253, dated Feb. 9, 2023, 7 pages including machine-generated partial translation.

Australian Office Action from Australian Patent Application No. 2022202933, dated Feb. 14, 2023, 3 pages.

Chinese Notice of Allowance from Chinese Patent Application No. 201980024441.6, dated Jun. 25, 2023, 5 pages with English language translation of search.

Chinese Board Opinion from Chinese Patent Application No. 201980024341.3, dated Jul. 20, 2023, 13 pages including English language summary.

European Office Action from European Patent Application No. 19714014.8, dated Sep. 26, 2023, 14 pages.

Japanese Office Action from Japanese Patent Application No. 2022-136171, dated Sep. 4, 2023, 9 pages including English language translation.

\* cited by examiner

MODIFYING VIDEO STREAMS WITH SUPPLEMENTAL CONTENT FOR VIDEO CONFERENCING

CROSS-REFERENCE TO RELATED APPLICATIONS

The present application claims the benefit of U.S. patent application Ser. No. 16/151,244, entitled "Modifying Video Streams with Supplemental Content for Video Conferencing," filed on Oct. 3, 2018, which claims the benefit of U.S. Provisional Patent Application Ser. No. 62/668,126, entitled "Modifying Video Streams with Supplemental Content for Video Conferencing," filed on May 7, 2018, which is hereby incorporated by reference in its entirety for all purposes.

TECHNICAL FIELD

The present description relates generally to modifying video streams, and more particularly to modifying images with supplemental content for video conferencing.

BACKGROUND

Video conferencing allows people in remote locations to interact as if they are in an in-person meeting by exchanging live video streams between the remote locations. For example, a camera in a conference room in Chicago is used to capture and immediately transmit video of the Chicago conference room, for display in a remote conference room in New York City. A television in the New York City conference room displays the incoming video of the Chicago conference room, so that people in the New York City conference room can view the current actions of the people in the Chicago conference room. Similarly, a camera in the New York City conference room is used to capture and immediately transmit video of the New York City conference room, for display on a television in the Chicago conference room, so that those people in the Chicago conference room can view the current actions of the people in the New York City conference room. In this way, the two remote conference rooms are virtually joined into a single conference room.

Historically, video conferencing has been facilitated with a dedicated camera and a dedicated television in each conference room, with limited control over the outgoing or incoming video feed other than to adjust the position, zoom, and focus of the camera. However, cameras and associated displays are now commonly provided in a single device such as a smartphone, a tablet, a laptop computer, or a desktop computer that also includes vastly more processing power than the historical conference room configuration.

These devices can be provided with video conferencing applications that send outgoing video from the camera of the device and display incoming video from a camera of a remote device on a display of the same device. These applications can facilitate less expensive and more efficient conferencing systems and can allow video conferencing from any location such as a user's office, home, or even as the user moves from location to location while carrying a smartphone or tablet.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
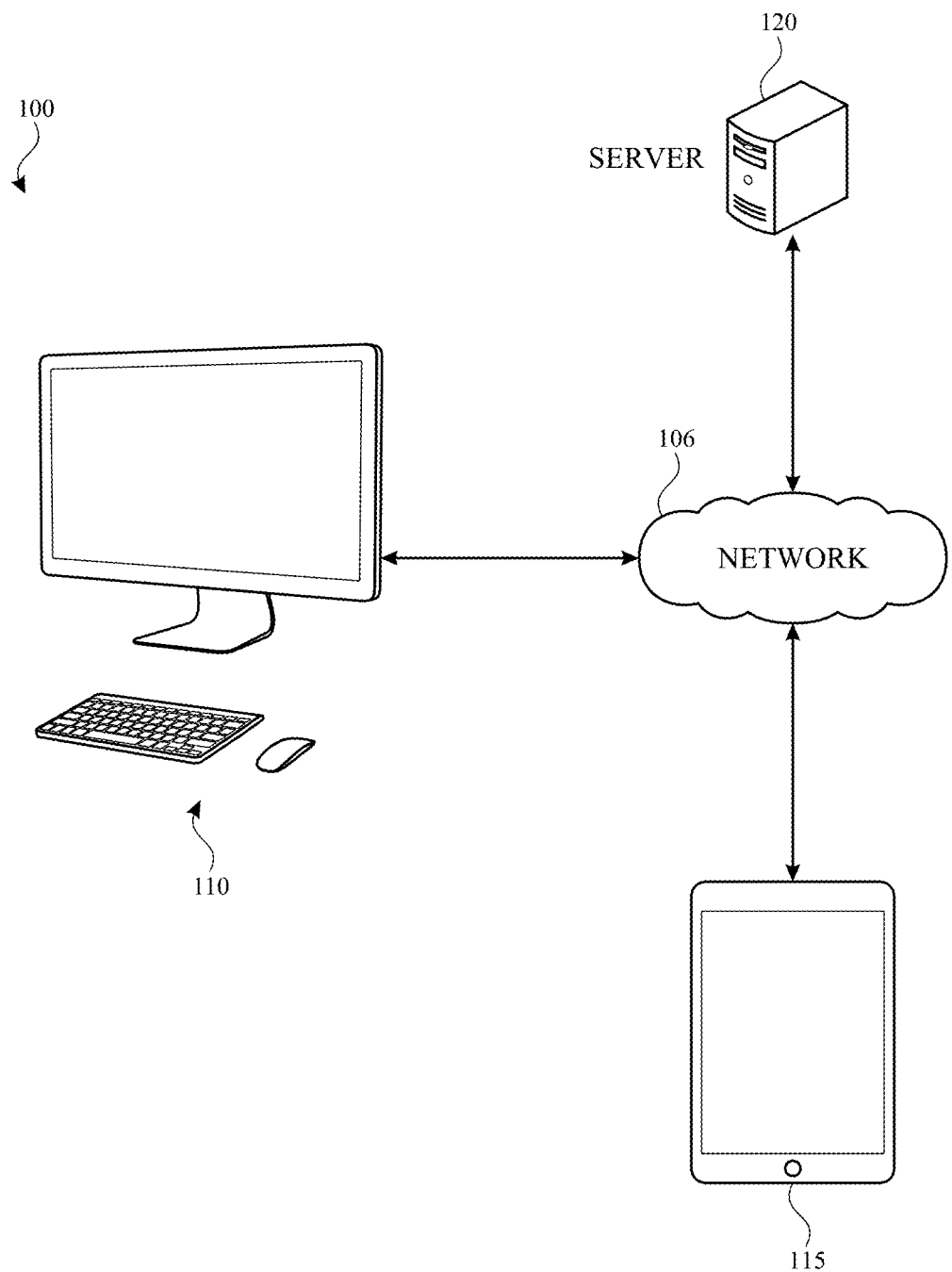
FIG. 1 illustrates an example network environment in which modifying video streams with supplemental content for video conferencing may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Video conferencing applications for electronic devices allow users to view a video feed from the camera of a remote device on their own device. The device of the viewing user can also send a video stream to the remote user from its own camera. Often, each user will use the camera on their own device to obtain video images of that user's face and/or the faces of other users local to or in the vicinity of the device, for transmission to one or more remote users in an outgoing video stream. In this way, users in remote locations can talk, in real time, while viewing incoming video streams of the other user or users' faces, to mimic an in-person conversation or conference. The outgoing and incoming video streams can be exchanged over cellular communications networks, wireless or wired local communications channels (e.g., Bluetooth or other direct peer-to-peer communications, or communications via a local area network), or over wider-area networks such as the Internet.

Particularly in mobile devices, it can be difficult to share information other than an outgoing video stream with a remote user during a video conferencing session. For example, a first user engaging in a video conferencing session with a second user may desire to send an image or an animation to the second user. However, the first user must often interrupt the outgoing video stream by suspending the video conferencing application to access the image or animation outside of the video conferencing application and to send the image or an animation via another channel such as via a messaging application or email application. This process can be time-consuming, inefficient, and disruptive to a video conference, which can discourage the use of supplemental content during a video conferencing application, and can make an electronic device a less effective tool for communications.

Some embodiments provide electronic devices with cameras and processing circuitry configured to run video conferencing applications that provide a user with the ability to add supplemental content directly into an outgoing video stream from within the video conferencing application (e.g., without requiring local storage of the video stream and without exiting the video conferencing application or accessing other applications).

The supplemental content can include static content such as sticker icons that can be placed over a portion of the outgoing video stream (e.g., an unchanging and un-animated image displayed at a static pixel location in multiple image frames of the outgoing video stream, the location, size, and orientation independent of the content of the video stream or the passage of time), animated content such as animated characters that can be placed over a portion of the outgoing video stream (e.g., a changing image or images displayed at a static pixel location in multiple image frames of the outgoing video stream, the location, size, and orientation independent of the content of the video stream), or adaptive content that can be placed over a portion of the outgoing video stream and that adaptively changes (e.g., in location, size, orientation, or content) based on changes in the content of the outgoing video stream.

Thus, various embodiments allow users to more efficiently and more effectively participate in videoconferencing sessions, e.g., as compared to devices with existing video conferencing applications described above.

FIG. 1 illustrates an example network environment 100 in which modifying video streams with supplemental content for video conferencing may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120, the electronic device 115 and/or the server 120, and/or electronic device 110 and/or the electronic device 115. In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 115, and a server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, standalone videoconferencing hardware, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a desktop computer. The electronic device 110 may be, and/or may include all or part of, the electronic system discussed below with respect to FIG. 16. In one or more implementations, the electronic device 110 may include a camera and may provide a video conferencing application for exchanging and/or modifying video streams over the network 106 with electronic device 115.

The electronic device 115 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 115 may not include a touchscreen but may support touchscreen-like gestures, such as in a virtual reality or augmented reality environment. In FIG. 1, by way of example, the electronic device 115 is depicted as a tablet device with a touchscreen. In one or more implementations, the electronic device 115 may be, and/or may include all or part of, the electronic device discussed below with respect to the electronic system discussed below with respect to FIG. 16. In one or more implementations, the electronic device 115 may also include a camera and may provide a video conferencing application for exchanging and/or modifying video streams over the network 106 to with electronic device 110.

In one or more implementations, the server 120 manages secure exchange of video streams between electronic devices 110 and 115. In one or more implementations, the server 120 may store content for inclusion in the video streams. For example, the server may store supplemental content that can be added to an outgoing video stream before transmission to a remote device or to an incoming video stream after receipt from a remote device. However, it should be appreciated that supplemental content for modifying outgoing or incoming video streams may be stored locally by electronic device 110 and/or electronic device 115 for modification of the video stream prior to sending or after receipt. Modification of an outgoing video stream may include modification, by a video conferencing application (or other application or operating system process), of a video stream being captured by a camera on a local device that is performing the modification. Modification of an incoming video stream (e.g., a video stream generated by a remote device and transmitted to the local device) may be performed based on modification instructions provided by the local user on the local device or may be performed to render modifications made by the remote user providing the incoming video stream (e.g., based on metadata including instructions for modifying the incoming video stream and/or rendering the modified incoming video stream).

Figure 2:
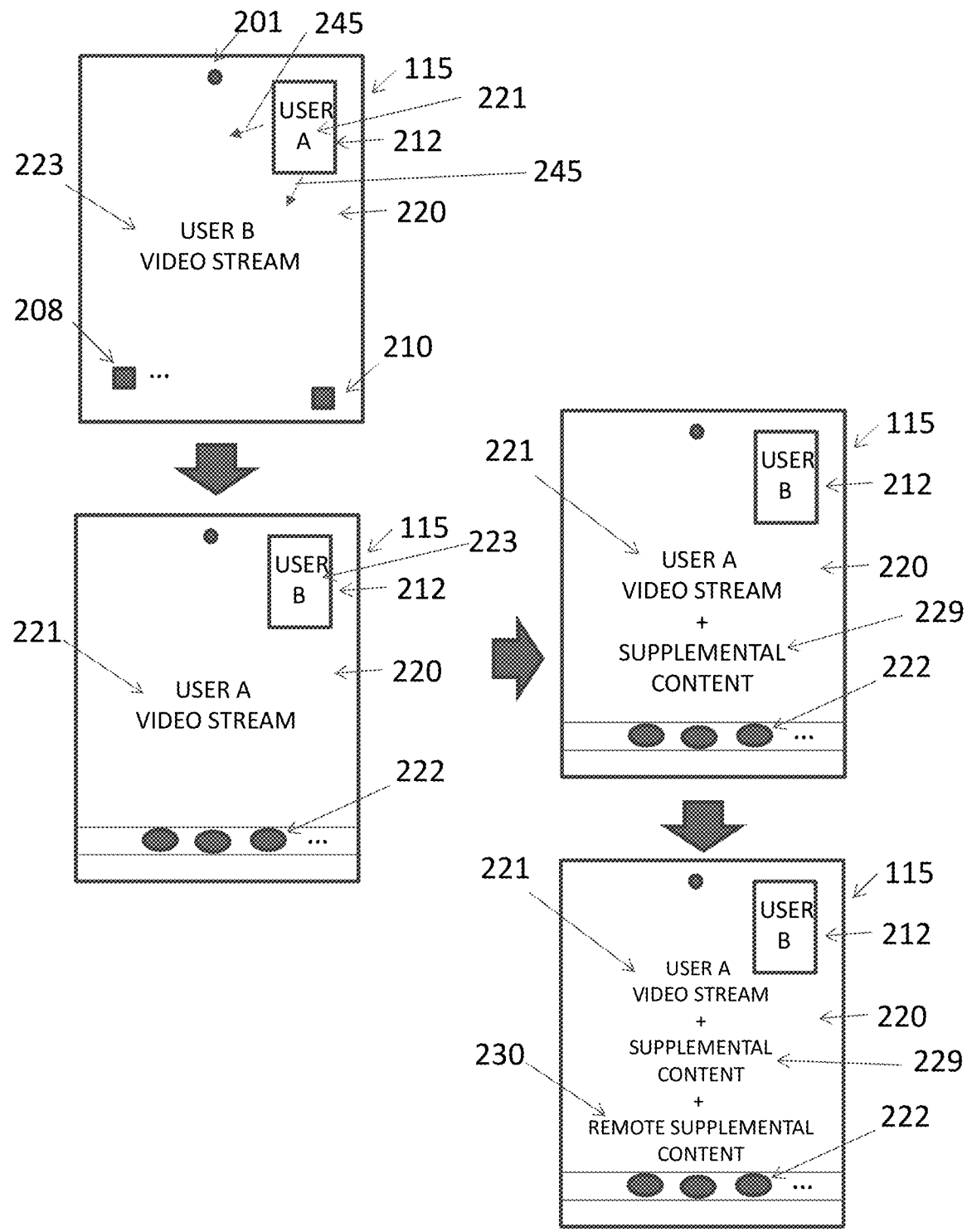
FIG. 2 illustrates a schematic diagram showing exemplary user interface views in which video streams are modified with supplemental content for video conferencing in accordance with one or more implementations.
Figure 6:
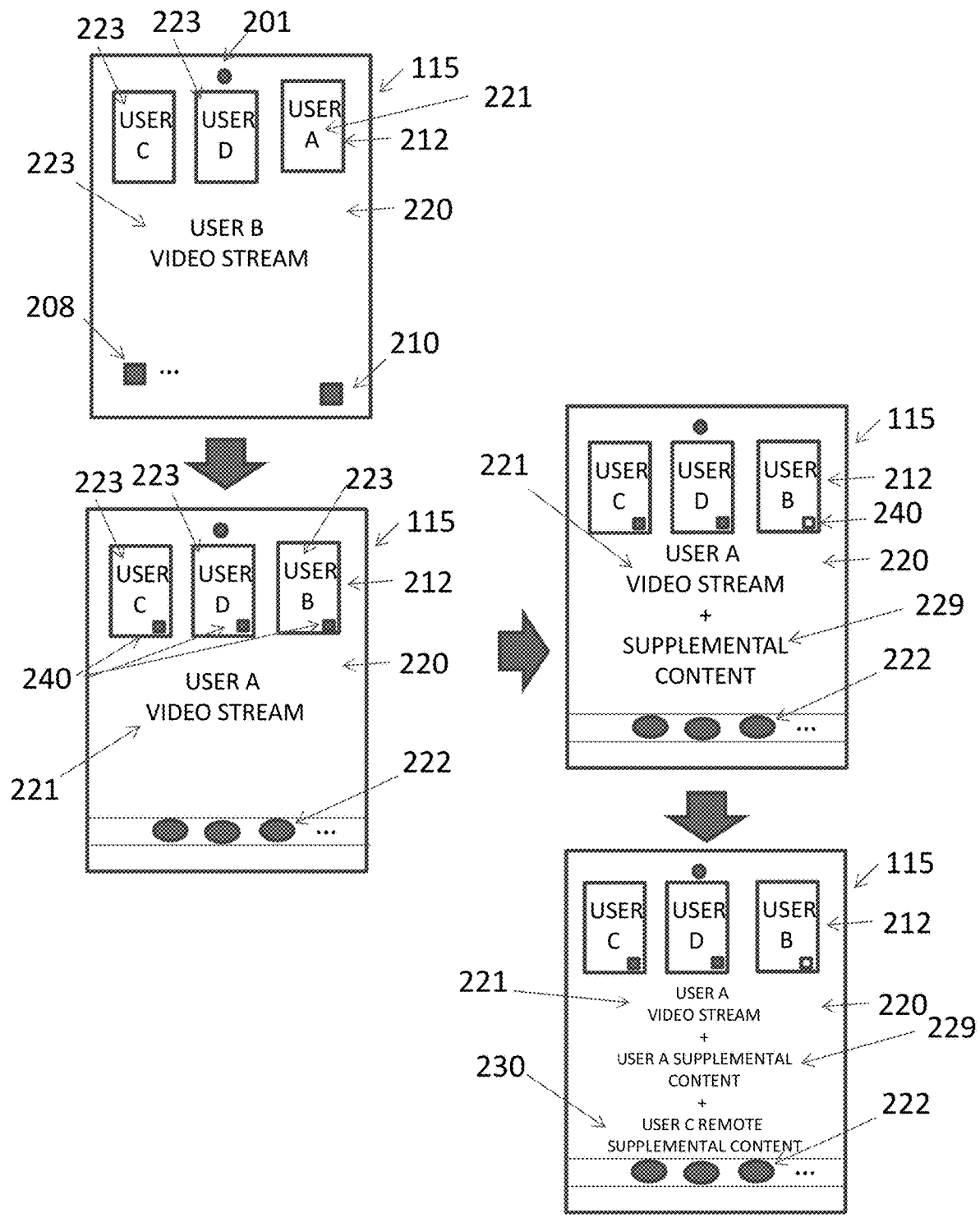
FIG. 6 illustrates a schematic diagram showing exemplary user interface views in which video streams are modified with supplemental content for multi-party video conferencing in accordance with one or more implementations.

An example of modifying an outgoing video stream with supplemental content is illustrated in FIG. 2. An example process for modifying an outgoing video stream with supplemental content is discussed further below with respect to FIG. 3. An example of modifying an outgoing video stream with supplemental content for multiple remote devices is illustrated in FIG. 6. An example process for modifying an outgoing video stream with supplemental content for multiple remote devices is discussed further below with respect to FIG. 7. An example of modifying an incoming video stream with supplemental content is illustrated in FIG. 8. An example process for modifying an incoming video stream with supplemental content is discussed further below with respect to FIG. 9.

FIG. 2 illustrates various user-interface views of electronic device 115 during operation of a video conferencing application. As shown in FIG. 2, the video conferencing application can include a primary video stream view 220 and a secondary video stream view 212 such as a picture-in-picture video stream view. Electronic device 115 as shown in FIG. 2 includes a camera 201 that obtains a continuous stream of image frames that are provided to the video conferencing application for viewing by the user of electronic device 115 (e.g., a user "A") and/or for transmission to a remote user (e.g., a user "B").

In the example of FIG. 2, the video stream 221 from camera 201 is an outgoing video stream being transmitted from electronic device 115 to an electronic device (e.g., electronic device 110) of remote user "B" and being displayed for user A in secondary video stream view 212. In the example of FIG. 2, an incoming video stream 223 from user "B" is displayed for viewing by user "A" in primary video stream view 220. In the example of FIG. 2, primary video stream view 220 covers substantially the entire display of electronic device 115 with a portion being covered by the secondary video stream view 212. However, this is merely illustrative and other arrangements of primary and secondary video stream views 220 and 212 can be provided (e.g., two equally sized side-by-side or top-bottom video stream views).

As shown in FIG. 2, the video conferencing application, when run, also provides input options such as camera-select option 210 (e.g., for switching to a rear-facing camera or other camera to provide the outgoing video stream 221) and a supplemental-content mode option 208. When supplemental-content mode option 208 in the video conferencing application is selected, the video conferencing application displays one or more supplemental content options 222 together with the video streams being displayed (e.g., outgoing video stream 221 and/or incoming video stream 223).

In the example of FIG. 2, selection of supplemental-content mode option 208 causes the video conferencing application to swap the positions of outgoing video stream 221 from camera 201 and incoming video stream 223 from user "B", such that outgoing video stream 221 is shown in primary video stream view 220 for modification with supplemental content options 222 and incoming video stream 223 is shown in secondary video stream view 212. However, it should also be appreciated that, supplemental content options 222 may be provided without swapping the positions of outgoing video stream 221 and incoming video stream 223. For example, the position and size of outgoing video stream 221 from camera 201 and incoming video stream 223 can remain the same or can be moved and/or resized in other ways when supplemental-content mode option 208 (e.g., by increasing the size of secondary video stream view 212 as indicated by arrows 245). The relative sizes and positions of the outgoing video stream and one or more incoming video streams can be determined based on other inputs such as inputs by one or more of the users of the devices or based on audio input (e.g., by increasing the size of the video stream from a user that is currently talking).

It should also be appreciated that, in some scenarios as described in further detail hereinafter, supplemental content options 222 may be provided with incoming video stream 223 in primary video stream view 220 for modification with supplemental content.

Returning to the example of FIG. 2, when selected, supplemental content options 222 cause a processor of electronic device 115 to combine corresponding supplemental content 229 (e.g., supplemental content corresponding to that selected supplemental content option 222) with the video stream being displayed in primary video stream view 220. Supplemental content 229 may be static supplemental content that is displayed over or with outgoing video stream 221 obtained by camera 201 and displayed in primary video stream view 220, animated supplemental content that is displayed over or with outgoing video stream 221, or adaptive supplemental content that is displayed over or with outgoing video stream 221.

Static supplemental contact 229 may include digital stickers, word art, user-drawn content (e.g., content drawn using an input to a touch screen of the device with the user's finger or a stylus device) or other static content that can overlay or replace a portion one or more frames of a video stream. The static supplemental content, when displayed over or with a portion of outgoing video stream 221, can be moved, resized, rotated, or otherwise edited while the video stream is displayed at the local electronic device 115, and while the video stream modified with the static supplemental content is transmitted. If desired, to reduce the size of the video stream being transmitted, the portion of the video stream that would be covered by the static content can be zeroed or otherwise reduced in size so that a reduced size video stream (e.g., with the covered portion zeroed, compressed, reduced in resolution, or removed from the transmission) can be transmitted.

Animated supplemental content 229 may include previously stored animations such as animated digital images, downloaded or cloud-accessible animations, or user-generated animations that have been previously stored by electronic device 115 or server 120. The animated supplemental content, when displayed over a portion of outgoing video stream 221, can be moved, resized, rotated, or otherwise edited while the video stream is displayed at the local electronic device 115, and while the video stream modified with the static supplemental content is transmitted. Although the animated static content may change over time, the changes in the animated content are independent of changes in the content of the video stream being modified.

In contrast, adaptive supplemental content 229 that is added to outgoing video stream 221 may change (e.g., may be modified by the processor of electronic device 115) based on content in the outgoing video stream 221. For example, the adaptive supplemental content may include facial modification content for modifying a face in the image frames of outgoing video stream 221. When a supplemental content option 222 for facial modification content is selected from within the video conferencing application, the processor of the device may detect a face in outgoing video stream 221 from camera 201, apply the facial modification content to the detected face, and actively modify the facial modification content based on changes to the detected face (e.g., detected changes in the video stream).

For example, facial modification content may include one or more features of a head of an animal or an entire head of an animal (e.g., a fox, an elephant, a dog, or mouse) that replaces or overlays the face of a user in video stream 221 and that includes facial expressions that track, enhance, exaggerate, or otherwise respond to the facial expressions of the user's face in the video stream. The facial modification content may also change in size, position, and/or orientation in coordination with the size, position, and/or orientation of the user's head in the video stream (e.g., due to changes in the position and/or orientation of the user's head and/or changes in the distance between the user's head and the device).

The video conferencing application displays the video stream and the static, animated, or adaptive supplemental content in primary video stream view 220 and concurrently transmits the video stream and the static, animated, or adaptive supplemental content to the remote device so that the users of the two remote devices see the same modified video stream substantially at the same time.

It should also be appreciated that, in some scenarios, the supplemental content that is provided with the outgoing video stream can be editable by the receiving device (e.g., if the received video stream with the supplemental content is not integrated into the pixel values themselves by direct modification of the image pixel values at the sending device, such as by merging the layers of the image and the supplemental content, and the supplemental content is instead rendered at the receiving electronic device). In such scenarios, the processor of electronic device 110 may receive outgoing video stream 221 from electronic device 115 as an incoming video stream, the incoming video stream including video stream 221 and supplemental content 229. The video conferencing application of electronic device 110 displays video stream 221 and supplemental content 229 and provides supplemental content options at electronic device 110 for further modifying the video stream (e.g., by replacing supplemental content 229 with different supplemental content and/or removing supplemental content 229).

Integrating the supplemental content with the video stream allows the described supplemental content functionality to be backward compatible with remote devices that do not have the functionality for rendering a supplemented video stream (e.g., due to software that has not yet been updated or software on an older device), and also allows the described supplemental content functionality to be compatible with third party software and/or devices for which the sending device cannot determine whether the remote device has the described supplemental content functionality. In some cases, the user of electronic device 115 may be provided with the ability to choose whether to provide integrated or non-integrated supplemental content with a video stream. In some cases, electronic device 115 may automatically determine whether to provide the integrated or non-integrated supplemental content with a video stream (e.g., based on the available transmission bandwidth, the available functionality of the receiving device, or the lack of information about the functionality of the receiving device). In some scenarios, a video conferencing application of electronic device 115 may perform pre-conferencing (e.g., handshake) operations with a remote device to determine whether the remote device is capable of rendering supplemental content with a received video stream and/or whether the supplemental content is available at the remote device or should be provided to the remote device with the video stream (e.g., included in metadata for the supplemental content).

In one example, supplemental content 229 is an adaptive cartoon fox head that moves with and adapts to the face of user "A" in outgoing video stream 221, and further supplemental content may be added by user "B" to the video stream of user "A" by, for example, adding sunglasses or a hat to the fox head. In the example of FIG. 2, user "B" has added remote supplemental content 230 (e.g., the sunglasses) to the modified video stream provided from electronic device 115 and electronic device 115 has also added the remote supplemental content 230 to the displayed outgoing video stream shown in primary video stream view 220 (e.g., based on instructions received from the remote device).

The remote supplemental content may be transmitted to electronic device 115 by the remote device or obtained by electronic device 115 based on instructions from the remote device, for rendering by the processor of electronic device 115. In scenarios in which electronic device 115 receives instructions to obtain the further supplemental content from local storage of electronic device 115 or from server 120, the processor of electronic device 115 obtains the further supplemental content from local storage or cloud-based storage, based on the received instructions and displays, in primary video stream view 220, outgoing video stream 221 from camera 201, remote supplemental content 230, and/or the original supplemental content 229 that was added by the user of electronic device 115 (e.g., if that original supplemental content was not removed at the receiving device).

Figure 3:
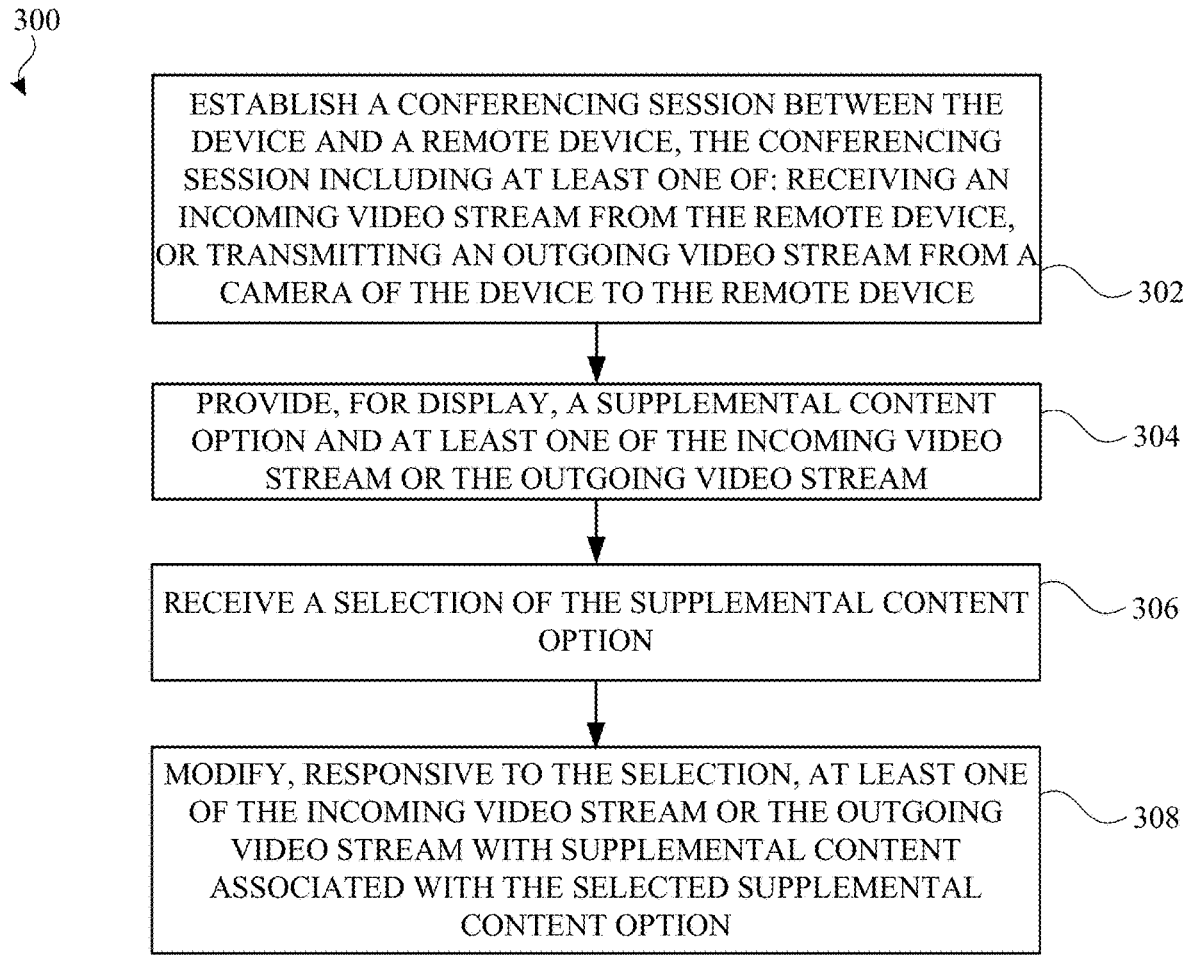
FIG. 3 illustrates a flow diagram of an example process for modifying video streams with supplemental content for video conferencing in accordance with one or more implementations.

FIG. 3 illustrates a flow diagram of an example process 300 for modifying outgoing video streams such as outgoing video stream 221 with supplemental content such as supplemental content 229 for video conferencing in accordance with one or more implementations. For explanatory purposes, the process 300 is primarily described herein with reference to the components of FIGS. 1 and 2 (particularly with reference to electronic device 115), which may be executed by one or more processors of the electronic device 115 of FIGS. 1 and 2. However, the process 300 is not limited to the electronic device 115, and one or more blocks (or operations) of the process 300 may be performed by one or more other components of other suitable devices, such as one or more of the electronic device 110 or the server 120. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

At block 302, a processor of electronic device 115 establishes a conferencing session between electronic device 115 and a remote electronic device such as electronic device 110. The conferencing session includes at least one of receiving incoming video stream 223 from remote electronic device 110, or transmitting outgoing video stream 221 from a camera such as camera 201 of electronic device 115 to the remote device. For example, in some scenarios, both electronic devices 115 and 110 transmit and receive video streams. A camera (and/or associated sensors) can have depth sensing ability and transmit the depth information (e.g., as metadata such as augmented-reality metadata) to the local video conferencing application and/or to the receiver. The local video conferencing application and/or the receiver can take depth information from the camera (and/or other sensors) and use the depth information to depict supplemental content overlays (e.g., to position, size, orient, and/or adapt the supplemental content to objects such as faces in the underlying image frames). In other scenarios, the video capabilities of electronic device 115 or electronic device 110 may be temporarily unavailable or one of electronic devices 115 or 110 may have limited bandwidth and may be receiving and displaying video but only transmitting audio.

At block 304, the processor of electronic device 115 provides, for display (e.g., responsive to a selection of supplemental-content mode option 208), a supplemental content option 222 and at least one of the incoming video stream 223 or the outgoing video stream 221.

At block 306, the processor of electronic device 115 receives a selection of the supplemental content option 222. For example, user "A" may select one or one or more supplemental content options 222 by tapping that option on a touch screen device, by pressing a physical button at or near the location of the displayed option, by providing an audio command, and/or by any other selection mechanism.

At block 308, the processor of electronic device 115 modifies, responsive to the selection, at least one of incoming video stream 223 or outgoing video stream 221 with supplemental content associated with the selected supplemental content option 222. The modified outgoing video stream may then be transmitted to one or more remote devices. In some scenarios, the processor of electronic device 115 receives further supplemental content (e.g., remote supplemental content 230) for the outgoing video stream from the remote device. In these scenarios, the processor of electronic device 115 may further modify outgoing video stream 221 with remote supplemental content 230 and transmit the further modified outgoing video stream to the remote electronic device.

In some scenarios, modifying the outgoing video stream and transmitting the modified outgoing video stream may include integrating the supplemental content into the outgoing video stream to form an integrated modified output video stream, and sending the integrated modified output video stream to the remote device. For example, the supplemental content may be integrated into the outgoing video stream by merging the layer(s) of the supplemental content and the layer(s) of the outgoing video stream into a single layer.

Figure 4:
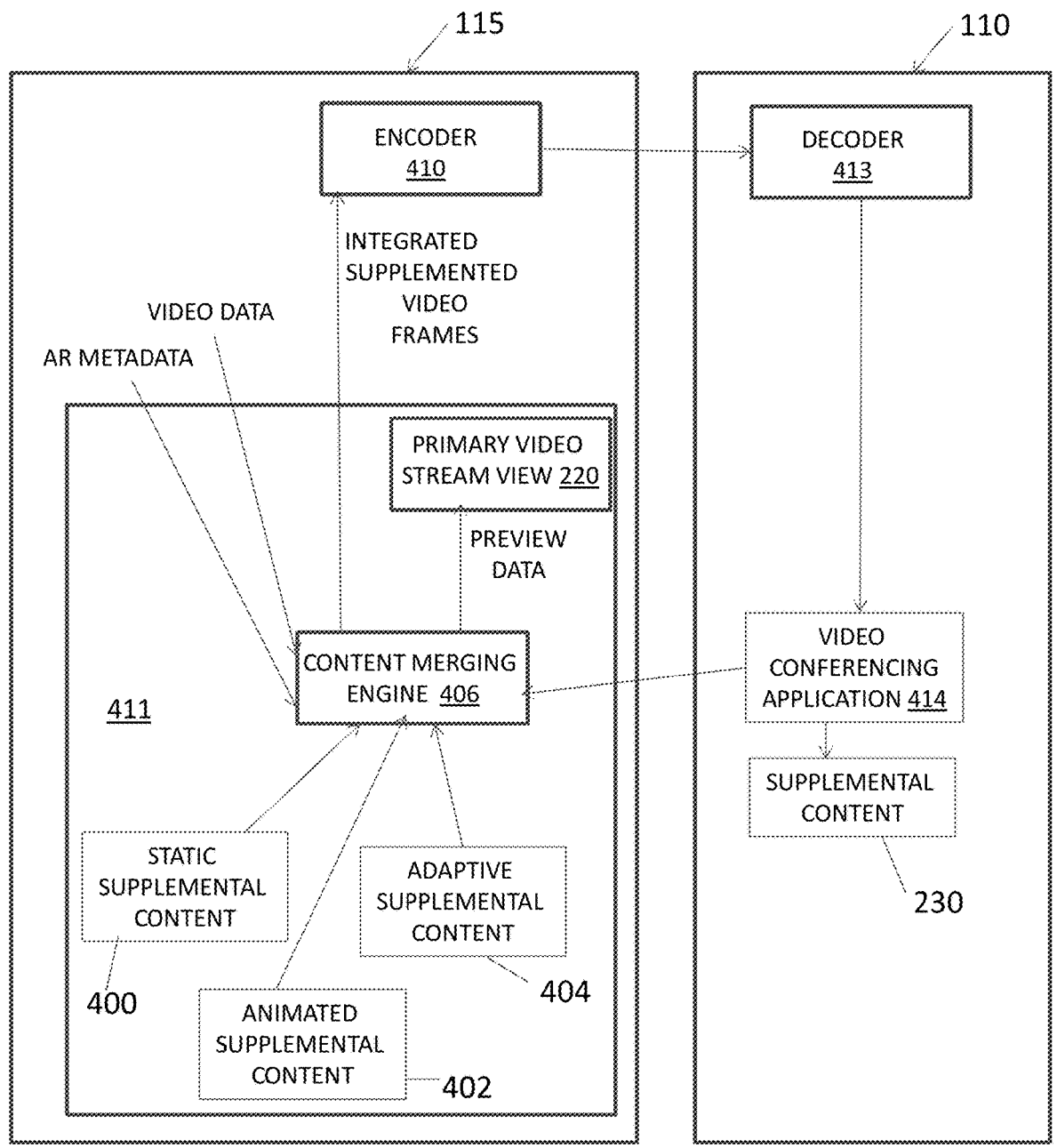
FIG. 4 illustrates a schematic diagram showing an exemplary data flow for integration of supplemental content with a video stream for transmission in accordance with one or more implementations.

FIG. 4 shows an example in which electronic device 115 generates an integrated modified output video stream for transmission. As shown in the example of FIG. 4, electronic device 115 may include a content merging engine 406 (e.g., a hardware component or a content-merging portion of a video conferencing application 411) that receives video data including a series of image frames from the camera. Content merging engine 406 may also receive supplemental content 229 such as static supplemental content 400, animated supplemental content 402, and/or adaptive supplemental content 404 as selected by the user of the device. Separate augmented-reality metadata may also be provided to the content merging engine if desired. Augmented-reality (AR) metadata may include information that describes physical objects such as people, facial features, animals, trees, bushes, flowers, streets, street signs, furniture or other physical objects that are represented in the video data image frames. For example the AR metadata may include depth information, size information, pixel location information, motion information, orientation information or other information about the physical objects. Content merging engine 406 may use the AR metadata to position, orient, size, and/or adapt, over time, the supplemental content that is added to the video stream from the camera. For example, if adaptive supplemental content including an animated animal face is selected to overlay an image of a user's face as captured by a front-facing camera on the user's smartphone, the AR metadata may indicate the boundaries, location, size, depth, and features (e.g., the locations of the eyes, ears, mouth, etc.) of the user's face, which can be used to size, locate, orient, and determine the facial expression of the animated animal face, as well as to animate the animated animal face to correspond to changes in the depth at which the user's face is imaged, the orientation or location of the imaged face, and/or the facial expression of the user.

In the example of FIG. 4, image frames of the video stream from the camera are modified by the addition of static supplemental content 400, animated supplemental content 402, and/or adaptive supplemental content 404 by adding supplemental content values to some or all of the pixel values of the image frames and/or replacing some or all of the pixel values of the image frames with supplemental content values. In this way, the supplemental content is integrated into the pixel values of the image frames themselves to form an integrated supplemented video stream, without storing information about the modification. The integrated supplemented video stream may be provided from content merging engine 406 to an encoder 410, such as a video encoder, of electronic device 115 for transmission (e.g., via communications circuitry and/or network interfaces of the device and via network 106) to a decoder 413 of the remote device (e.g., electronic device 110). In the example shown in FIG. 3, the integration of the video data and the supplemental content is performed by content merging engine 406. However, in other scenarios, encoder 410 may perform some or all of the integration of the video data and the supplemental content. In these integrated transmission examples, the integrated supplemented video stream is sent without any supplemental content metadata that describes the supplemental content as separate from the video stream from the camera and without AR metadata such as depth information.

Decoder 413 of the remote device may decode the encoded integrated supplemented video stream for display at the remote device (e.g., within a video conferencing application running on the remote device). Because the supplemented video stream was integrated prior to sending, the remote device displays the received integrated supplemented video stream without modification at the remote device.

In these integrated transmission scenarios, remote supplemental content 230 can be added to the integrated supplemented video stream by a video conferencing application 414 at the receiving device, or at the sending device (e.g., if instructions for adding the remote supplemental content are provided from the receiving device to the sending device). However, the remote device may perform image analysis operations to detect physical objects and/or supplemental content in the image frames for the addition of the remote supplemental content (e.g., because the integrated supplemented video stream does not include this information) and the supplemental content previously added at the sending device cannot be modified or removed at the receiving device to obtain the original image frames. The remote supplemental content 230 may be provided (e.g., via network 106 and/or server 120) to electronic device 115 (e.g., to the content merging engine 406) for inclusion in the preview stream at that device or for sending to other remote devices. If desired, at the sending device, preview data is provided to primary video stream view 220 such that the supplemental content may be displayed with the outgoing video stream in an editable form (e.g., the preview data may include the camera image frames and the supplemental content separately) to allow modifications to the supplemental content at the sending device. In the example of FIG. 4, primary video stream view 220 is shown as a part of video conferencing application 411, however it should be appreciated that video conferencing application 411 generates the primary video stream view content for display on a display of the electronic device 115.

As noted above, in some scenarios, it may be desirable to provide a modified video stream having supplemental content by adding metadata for the supplemental content to unmodified image frames from a camera, the metadata including instructions to modify the image frames with the supplemental content at the receiving device. In this way, a receiving user can be provided with the ability to identify modifications that have been made, undo the modifications and/or further modify the video stream with the receiving device. In this way, the amount of data to be transferred can also be reduced (e.g., if the supplemental content is stored on both devices and rendered at the receiving device, using the supplemental content stored at that device based on instructions received in metadata with the unmodified video stream image frames).

Accordingly, in some scenarios, modifying the outgoing video stream and transmitting the modified outgoing video stream may include sending the outgoing video stream, the supplemental content, and instructions for rendering the outgoing video stream and the supplemental content to the remote device. In some scenarios modifying the outgoing video stream and transmitting the modified outgoing video stream may include sending the outgoing video stream and instructions for obtaining and rendering the supplemental content to the remote device.

Figure 5:
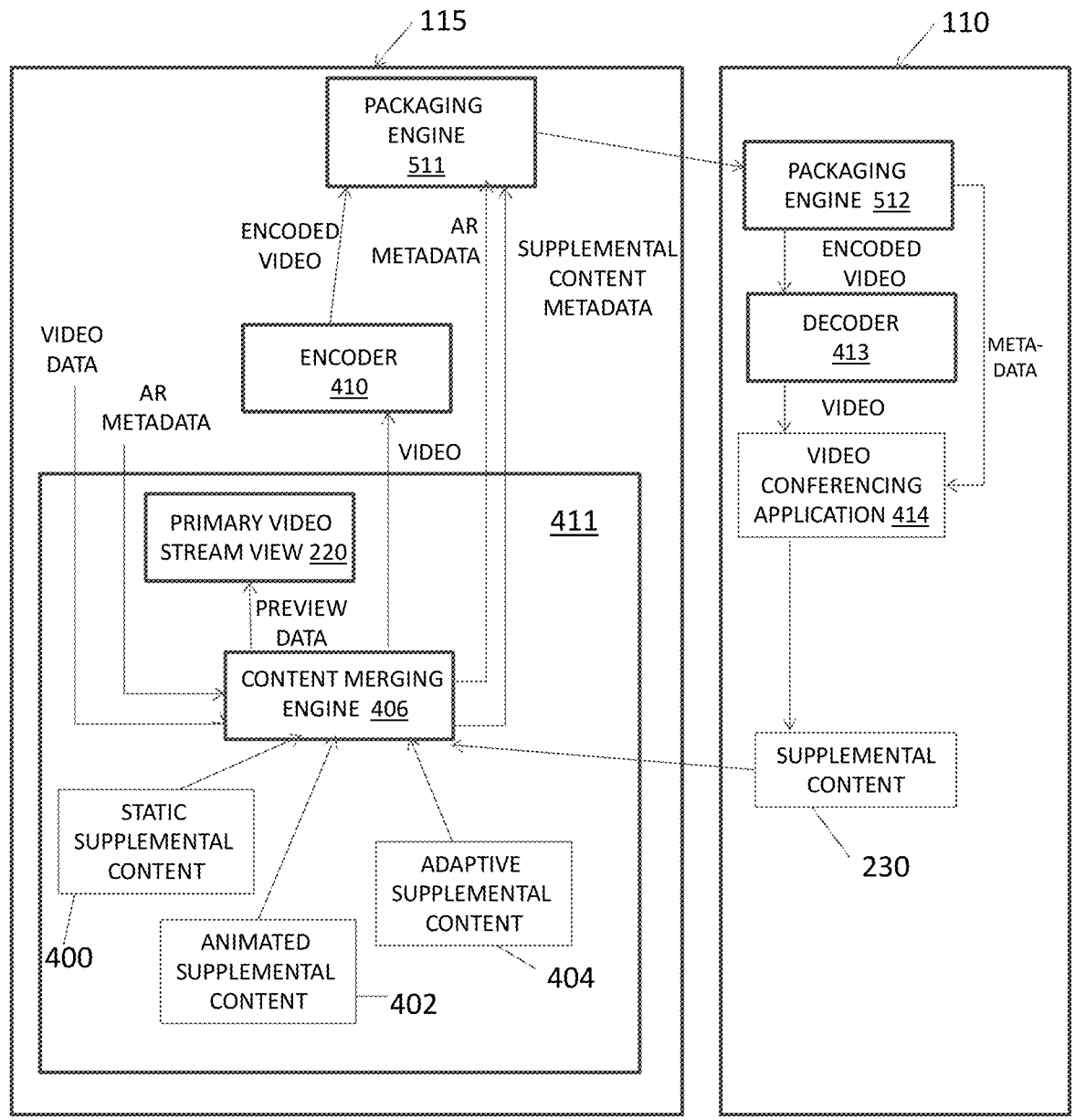
FIG. 5 illustrates a schematic diagram showing an exemplary data flow for packaging of supplemental content metadata to accompany a video stream for transmission in accordance with one or more implementations.

For example, as shown in FIG. 5, when the content merging engine 406 of the video conferencing application of the sending electronic device (e.g., electronic device 115) receives video data including a series of image frames from the camera and receives static supplemental content 400, animated supplemental content 402, and/or adaptive supplemental content 404 as selected by the user of the electronic device 115, instead of integrating the supplemental content into the pixel values of the image frames and providing the modified pixel values to encoder 410 for encoding and transmission, the content merging engine 406 may send only the image frames (video) to the encoder 410 while supplemental content metadata and/or AR metadata is provided directly to a packaging engine 511 (e.g., a transport protocol engine such as a real-time transport protocol (RTP) engine) of the device.

As shown in FIG. 5, the packaging engine 511 may receive encoded video data from the encoder 410 and package the encoded video, the supplemental content metadata, and/or the AR metadata for transmission to a packaging engine 512 (e.g., a transport protocol engine such as an RTP engine) at the remote device (e.g., via network 106). The packaging engine 512 at the remote device separates (unpacks) the supplemental content metadata and/or the AR metadata from the encoded video stream, provides the supplemental content metadata and/or the AR metadata to the video conferencing application 414, and provides the encoded video data to the decoder 413. The decoder 413 decodes the video data and provides the incoming video stream to the video conferencing application 414.

When the video conferencing application 414 receives the supplemental content metadata, the AR metadata, and the decoded incoming video stream, the video conferencing application 414 modifies the incoming video stream based on the supplemental content metadata for display in the video conferencing application of the remote device. For example, the video conferencing application 414 of the remote device may obtain the supplemental content from the supplemental content metadata itself, or from local storage at the remote device or cloud-based storage based on instructions in the supplemental content metadata. The video conferencing application 414 may then modify each of the series of image frames of the video stream by addition of the obtained supplemental content 229 (e.g., by adding supplemental content values to some or all of the pixel values of the image frames and/or replacing some or all of the pixel values of the image frames with supplemental content values) for display.

In these non-integrated transmission scenarios, the supplemental content from the sending device can be modified or removed from the video stream at the remote device and/or additional remote supplemental content 230 can be added to the supplemented video stream at the receiving device.

The examples described above in connection with FIGS. 2-5 illustrate a video conferencing session between two devices. However, it should be appreciated that video conferencing with supplemental content can be provided for group conferences between more than two devices.

FIG. 6 illustrates various user interface views of electronic device 115 during operation of a video conferencing application for a video conferencing session with more than two participants.

As shown in FIG. 6, a video conferencing application running on electronic device 115 may display the incoming video stream 223 from user "B" in primary video stream view 220, the outgoing video stream 221 of user "A" in secondary video stream view 212, and additional incoming video streams 223 from additional remote devices (e.g., remote devices of users "C" and "D") in additional secondary video stream views 212.

Outgoing video stream 221 is provided to the remote devices of each of users "B", "C", and "D", and displayed on those remote devices if video capability and sufficient bandwidth are available for that device. As shown, the secondary video stream view 212 for the outgoing video stream may be offset, or otherwise distinguished from the incoming video streams in the other secondary video stream views.

As shown in FIG. 6, when the supplemental-content mode option 208 is selected to enter a supplemental content entry mode of the video conferencing application, supplemental content options 222 are provided and outgoing video stream 221 is swapped into primary video stream view 220 (or otherwise increased in size or position as described above in connection with FIG. 2) for modification with supplemental content. The example of FIG. 6 also shows how, in the supplemental content entry mode, a selectable option 240 is provided for each remote device in the video conferencing session. Selecting the selectable option 240 for a remote device allows that remote device to view supplemental content that is added to the outgoing video stream. Deselecting the selectable option 240 for a remote device prevents that remote device from viewing supplemental content that is added to the outgoing video stream, such that that device receives an unmodified outgoing video stream, even if other devices in the video conferencing session receive a modified outgoing video stream with supplemental content. If none of selectable options 240 are checked, the supplemental content may be displayed only at the local device (e.g., as a preview).

In the example of FIG. 6, selectable option 240 for the remote device of user "B" is deselected and one of supplemental content options 222 is selected to add supplemental content 229 to outgoing video stream 221. In this example, the remote devices of users "C" and "D" receive outgoing video stream 221 modified with supplemental content 229 and the remote device of user "B" receives the unmodified outgoing video stream 221 (or a different modified video stream). In should also be appreciated that electronic device 115 can determine automatically, in some scenarios, whether to provide the supplemental content to one or more of the remote devices (e.g., based on software compatibility, bandwidth availability, remote device functionality, or the like).

In the example of FIG. 6, user "C" then further modifies the video stream of user "A" by adding remote supplemental content 230 to the video stream (e.g., by sending instructions to electronic device 115 to add the remote supplemental content responsive to user "C" selecting a supplemental content option 222 the remote device of user "C"). The further modified video stream of user "A" is displayed in primary video stream view 220 and transmitted to users "C" and "D".

Figure 7:
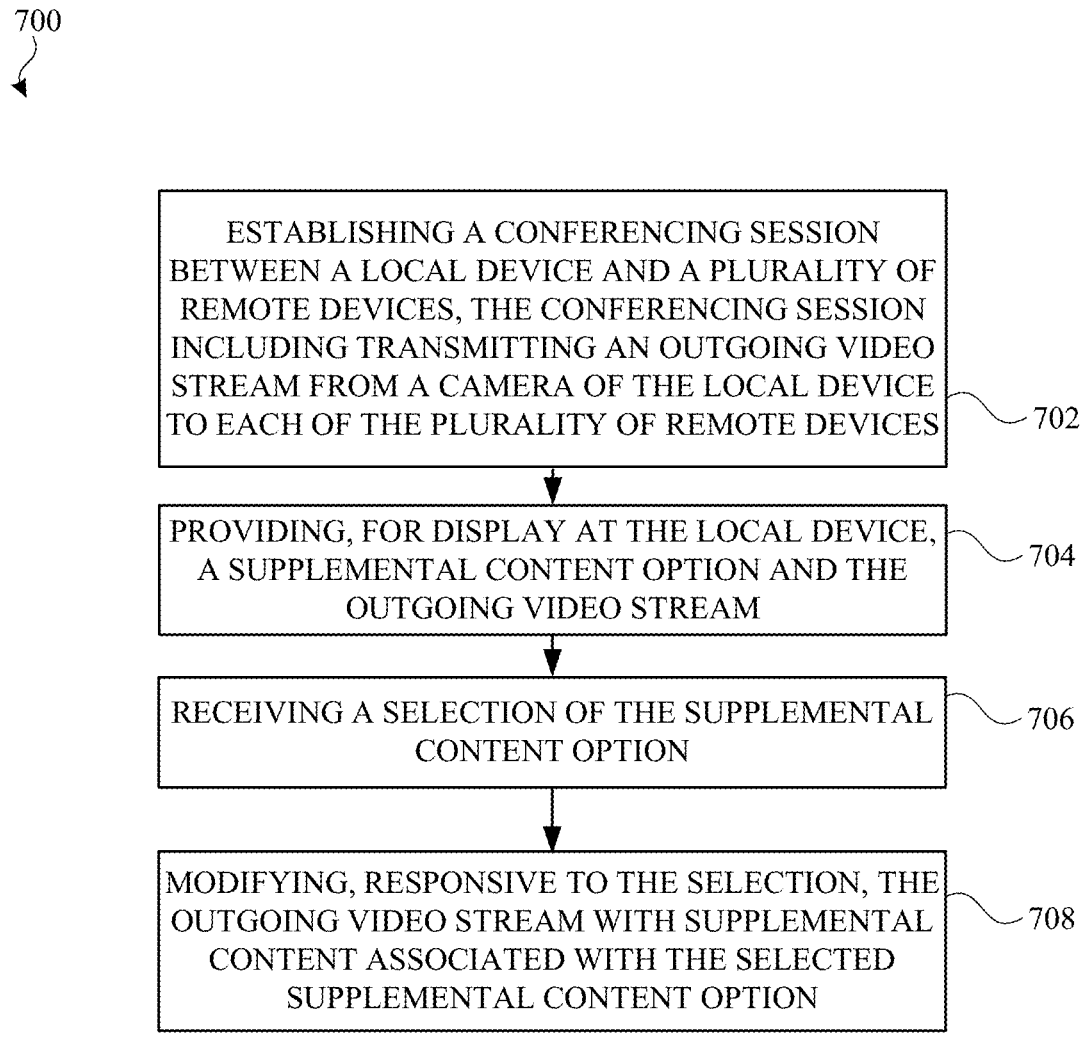
FIG. 7 illustrates a flow diagram of an example process for modifying images with supplemental content for multi-party video conferencing in accordance with one or more implementations.
Figure 8:
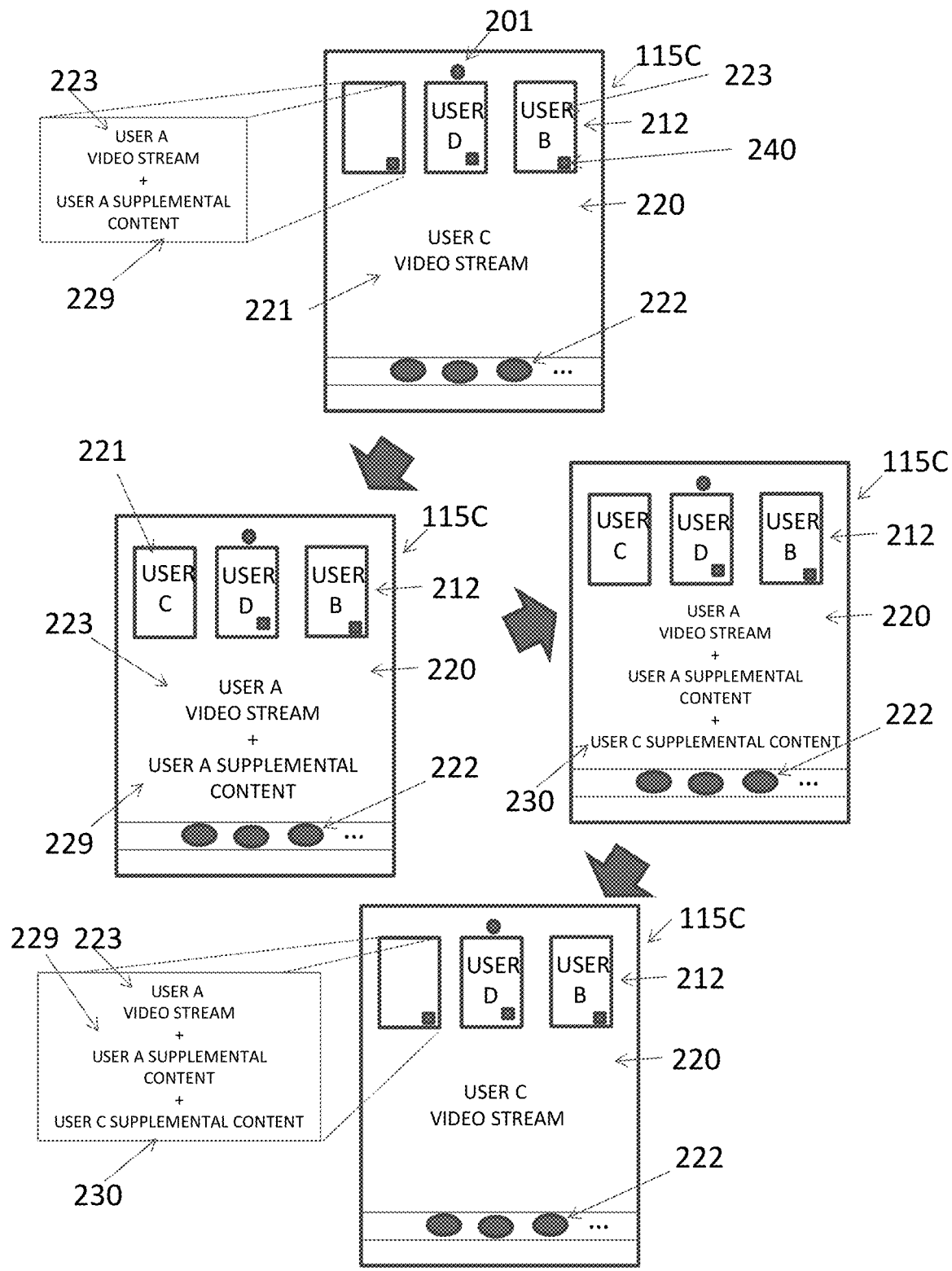
FIG. 8 illustrates a schematic diagram showing exemplary user interface views during modifying an incoming video stream with supplemental content in accordance with one or more implementations.

FIG. 7 illustrates a flow diagram of an example process 700 for modifying outgoing video streams such as outgoing video stream 221 with supplemental content such as supplemental content 229 for video conferencing with more than two participants in accordance with one or more implementations. For explanatory purposes, the process 700 is primarily described herein with reference to the components of FIGS. 1 and 2 (particularly with reference to electronic device 115), which may be executed by one or more processors of the electronic device 115 of FIGS. 1, 2, and 4. However, the process 700 is not limited to the electronic device 115, and one or more blocks (or operations) of the process 700 may be performed by one or more other components of other suitable devices, such as one or more of the electronic device 110 or the server 120. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, a processor of electronic device 115 establishes a conferencing session between an electronic device 115 (e.g., a local device) and multiple remote devices (e.g., multiple electronic devices 110 and/or other electronic devices 115), the conferencing session including transmitting an outgoing video stream 221 from a camera such as camera 201 of the local electronic device to each of the remote electronic devices. The outgoing video stream may be displayed in a video stream view of a video conferencing application stored in memory of electronic device 115 and executed by the processor of electronic device 115. In one or more implementations, a server may coordinate and/or facilitate the conferencing session between the electronic device 115 and the remote devices. For example, the electronic device 115 may provide a single outgoing video stream 221 to server 120 and server 120 may distribute the outgoing video stream to each of multiple remote electronic devices.

At block 704, the processor of electronic device 115 provides, for display at the local device, a supplemental content option 222 and the outgoing video stream 221. The supplemental content option 222 and the outgoing video stream 221 are displayed within the video conferencing application. As described above in connection with, for example, FIG. 2, the supplemental content option may be an option to add static, animated, and/or adaptive content to the outgoing video stream.

At block 706, the processor of electronic device 115 receives a selection of the supplemental content option (e.g., responsive to user "A" tapping or otherwise selecting the displayed supplemental content option).

At block 708 the processor of electronic device 115 modifies, responsive to the selection, the outgoing video stream 221 with supplemental content 229 associated with the selected supplemental content option 222. The modified outgoing video stream may then be provided to some or all of the remote devices. In some operational scenarios, the outgoing video stream without the supplemental content is provided to at least one the remote devices. During a video conferencing session between more than two devices, when a supplemental content option 222 is provided for modification of an outgoing video stream, a selectable option 240 for each remote device may also be provided for display, the selectable option of each remote device configured to allow or prevent that remote device from receiving the supplemental content with the outgoing video stream. The selectable option for providing each remote device with the supplemental content may be displayed in connection with an incoming video stream or another visible indicator for that remote device.

As noted above, supplemental content that is provided with an outgoing video stream can be editable by the receiving device in some scenarios. In particular, in scenarios in which the supplemental content and the outgoing video stream are not integrated prior to transmission, metadata provided with the transmission can allow the receiving device to identify, modify, and/or further supplement the supplemental content added by the sender.

FIG. 8 illustrates various user interface views of a receiving electronic device 115C of user "C" during operation of a video conferencing application for a video conferencing session with more than two participants. As shown in FIG.

8, when user "A" in a video conferencing session with users "B", "C", and "D" adds supplemental content 229 to its outgoing video stream 221 (see, e.g., FIG. 6), that modified stream is received at electronic device 115C of user "C" as an incoming video stream 223 and displayed in a secondary video stream view 212.

In the example of FIG. 8, the outgoing video stream 221 of user "C" is displayed in primary video stream view 220 with supplemental content options 222. In this configuration, selecting one of supplemental content options 222 causes associated supplemental content to be added to outgoing video stream 221 of user "C" and provided to the remote devices of each of users "A", "B", and "D" (because the selectable options 240 of each are selected in this example).

As shown in FIG. 8, user "C" can swap the modified incoming video stream 223 from user "A" into primary video stream view 220 and add user "C" supplemental content 230 (noted as remote supplemental content in FIG. 6 when referencing the device of user "A") to the video stream of user "A" to which supplemental content 229 has already been added. In the example of FIG. 8, user "C" then swaps the incoming video stream 223 from user "A", now modified to include supplemental content 229 added by user "A" (e.g., a fox head over the face of user "A" in the video stream of user "A") and additional supplemental content 230 added by user "C" (e.g., sunglasses on the fox head), to be displayed in one of secondary video stream views 212.

Figure 9:
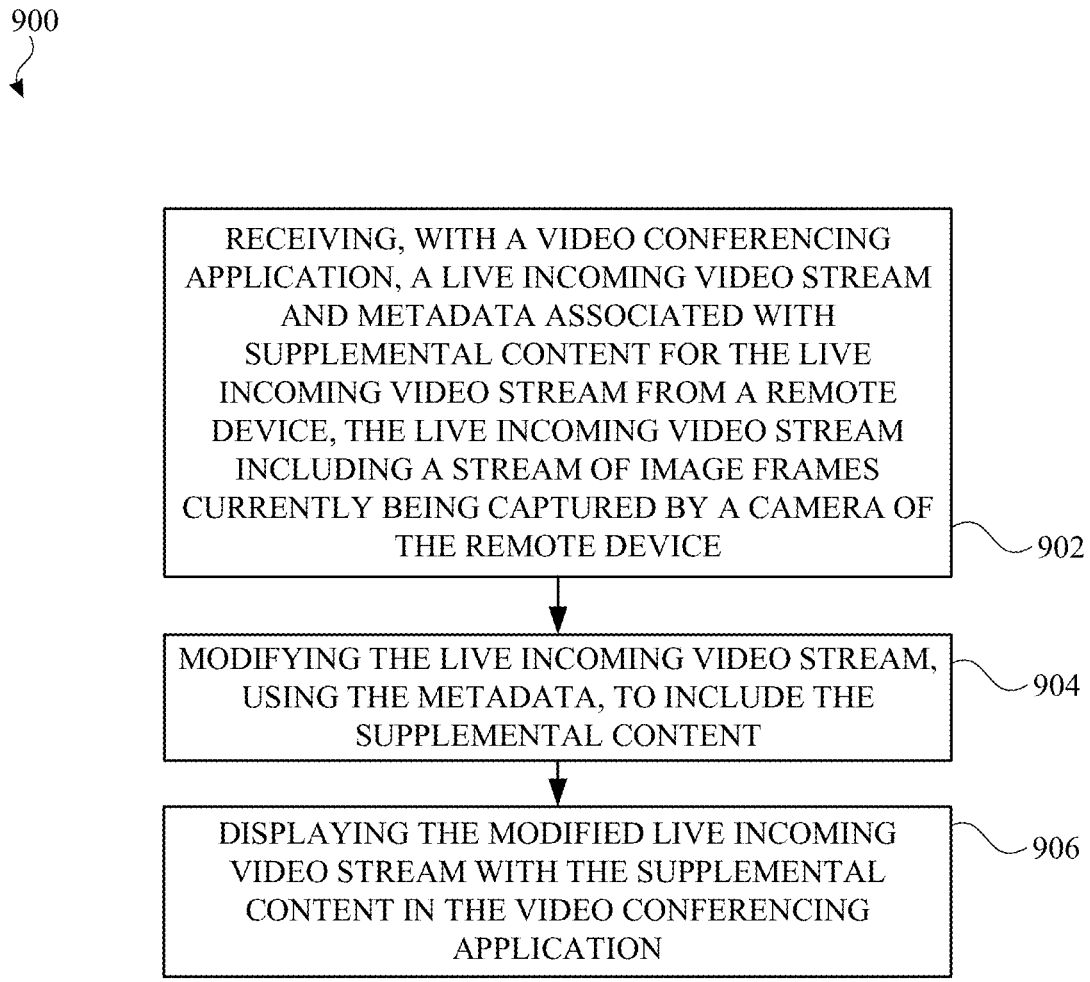
FIG. 9 illustrates a flow diagram of an example process for modifying an incoming video stream with supplemental content in accordance with one or more implementations.

FIG. 9 illustrates a flow diagram of an example process 900 for receiving and displaying a modified incoming video stream including an incoming video stream from a remote camera modified with supplemental content (e.g., an incoming video stream 223 of user "A" provided with supplemental content 229 as described in FIG. 8) in accordance with one or more implementations. For explanatory purposes, the process 900 is primarily described herein with reference to components of FIGS. 1 and 2. However, the process 900 is not limited to the electronic device 115, and one or more blocks (or operations) of the process 900 may be performed by one or more other components of other suitable devices, such as one or more of the electronic device 110 or the server 120. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

At block 902, a receiving device such as electronic device 110 receives (e.g., with a video conferencing application) a live incoming video stream 223 and metadata associated with supplemental content 229 for the live incoming video stream from a remote device (e.g., electronic device 115). The live incoming video stream 223 may include a stream of image frames currently being captured (and/or being concurrently captured) by a camera such as camera 201 of the remote device. The live incoming video stream 223 may include a stream of image frames captured by a camera of the remote device and immediately transmitted by the remote device after capture. The receiving device may also transmit, concurrently with the receiving of the live incoming video stream, a live outgoing video stream from a local camera. In one or more implementations, a live incoming video stream in a video conferencing application may refer to a video stream being captured at a remote device and being immediately transmitted (e.g., as each frame of the video stream is captured) to the electronic device 110 (e.g. with a high quality of service) for immediate display at the electronic device 110 with minimal or no latency with respect to the time that the video stream is captured.

The metadata may include the supplemental content and instructions for modifying the live incoming video stream to include the supplemental content, or may include the live incoming video stream and instructions for obtaining the supplemental content and instructions for modifying the live incoming video stream to include the supplemental content without including the supplemental content itself.

At block 904, the receiving device (e.g., the processor of the receiving device) modifies the live incoming video stream 223, using the metadata, to include the supplemental content 229. Modifying the live incoming video stream may include adding supplemental content received with the live incoming video stream to the live incoming video stream, based on instructions received with the live incoming video stream. Modifying the live incoming video stream may also, or alternatively, include obtaining the supplemental content from local storage or cloud-based storage using an identifier in the metadata and applying the obtained supplemental content to a portion of one or more of the image frames of the live incoming video stream, the portion (e.g., the pixel locations) of the video stream identified in the metadata.

Since the live incoming video stream 223 is a live video stream being captured and transmitted for display with minimal latency, the receiving device may modify the live incoming video stream 223 with a high priority process such that the modification of the video stream does not add any latency (or minimal latency) to the display of the live incoming video stream 223 at the receiving device.

At block 906, the receiving device displays the modified live incoming video stream with the supplemental content (e.g., in the video conferencing application). In some scenarios, the receiving device may also provide, for display, a supplemental content option together with the modified live incoming video stream with the supplemental content. The receiving device may also receive a selection of the supplemental content option and modify, responsive to the selection, the modified live incoming video stream with additional supplemental content associated with the selected supplemental content option. When the supplemental content option is received at the receiving device for adding supplemental content to an incoming video stream from a remote device, the receiving device may also send instructions to the remote device (e.g., the device that is providing the live incoming video stream) to display the additional supplemental content. In this way, the added content from the receiving device can be displayed on both the sending and receiving devices.

Figure 10:
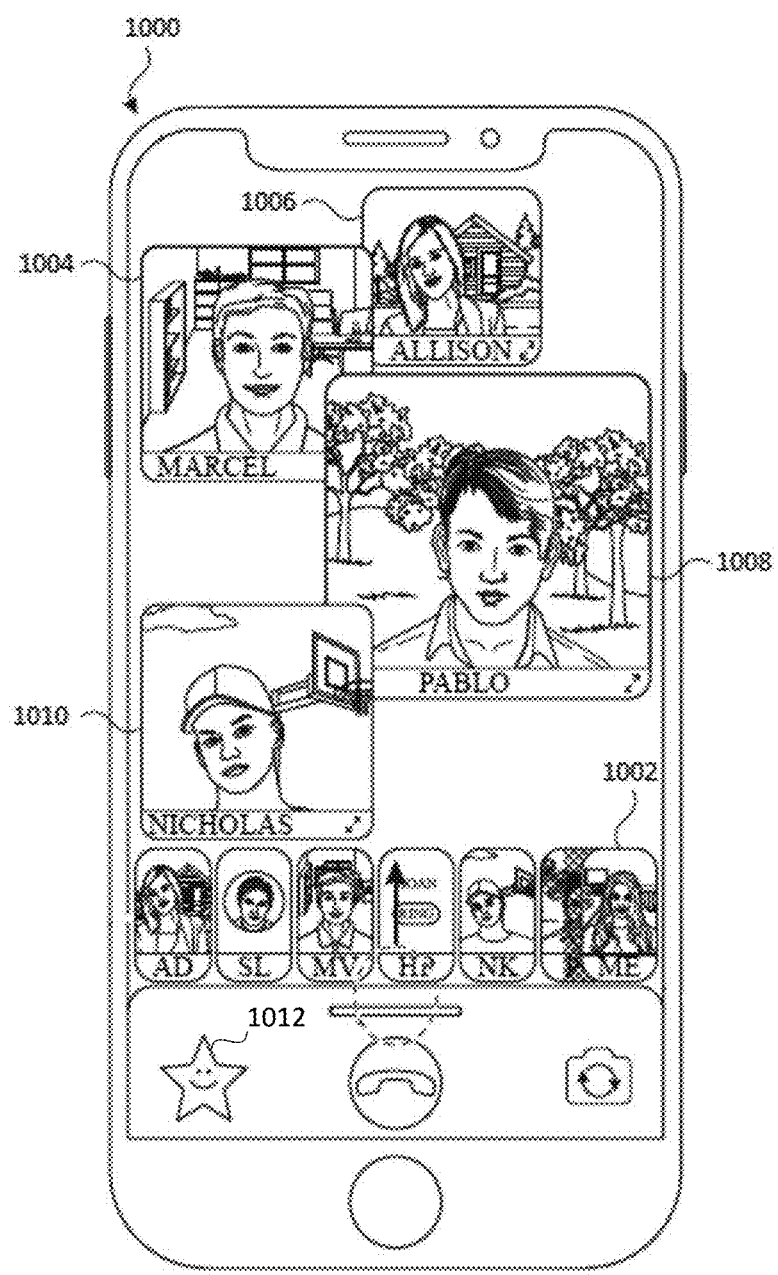
FIG. 10 illustrates an example user interface of an outgoing video stream and incoming video streams together with a supplemental content mode option in accordance with one or more implementations.
Figure 11:
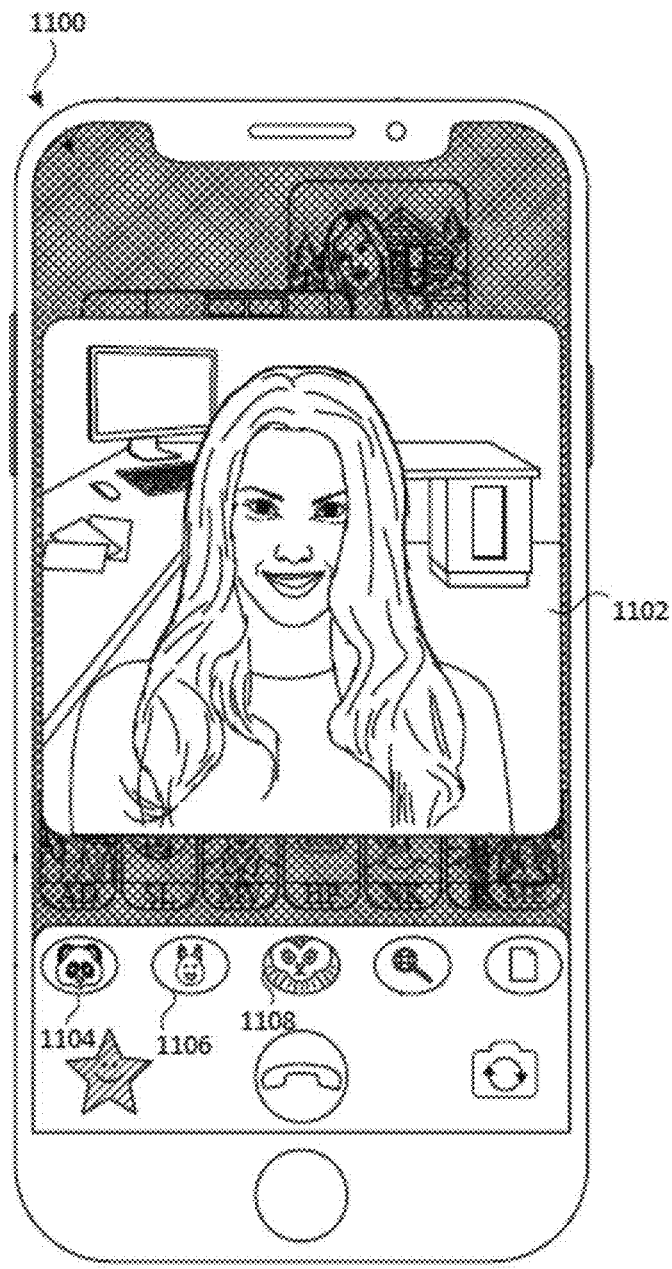
FIG. 11 illustrates an example user interface of an outgoing video stream with supplemental content options in accordance with one or more implementations.
Figure 12:
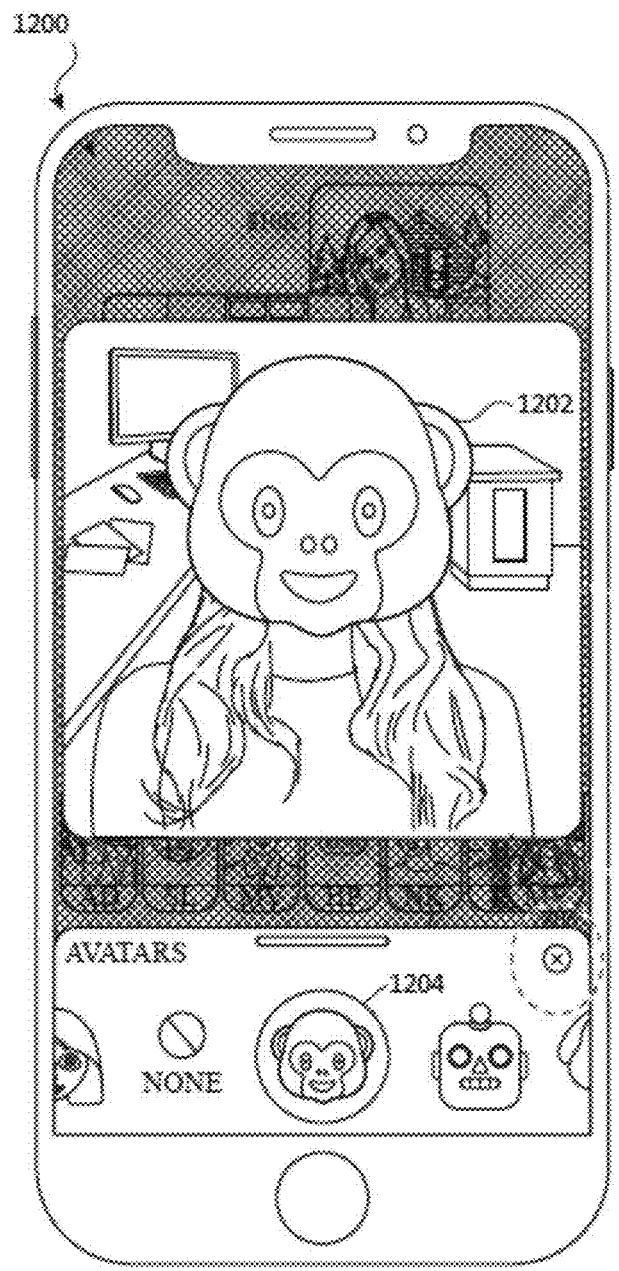
FIG. 12 illustrates an example user interface of an outgoing video stream with supplemental content in accordance with one or more implementations.
Figure 13:
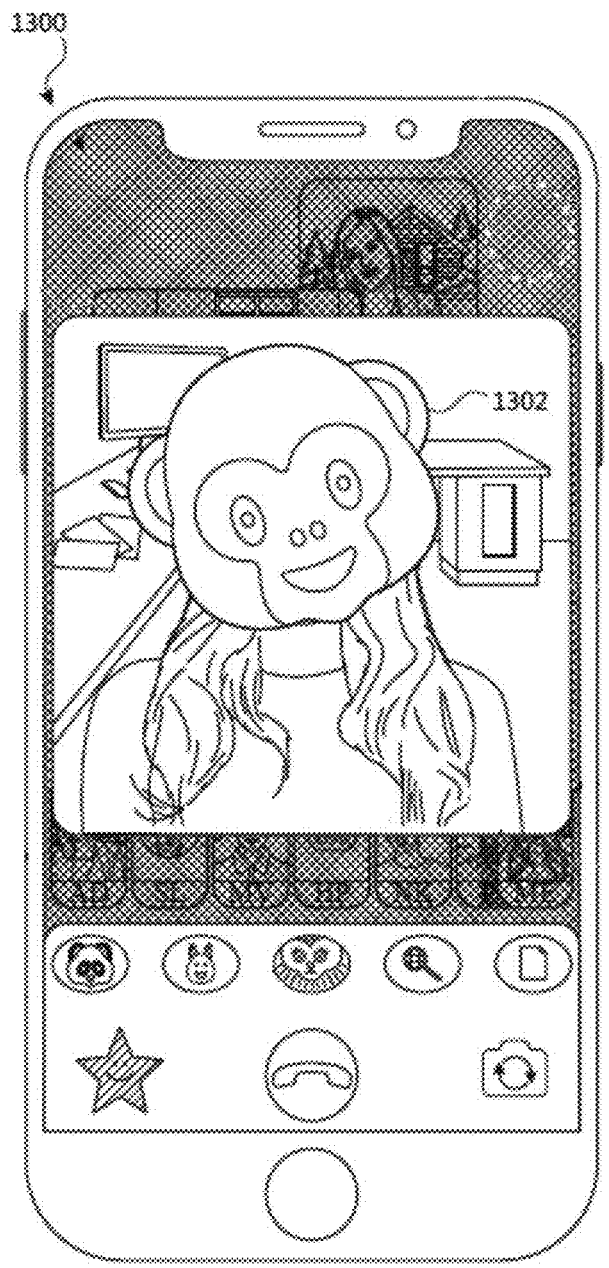
FIG. 13 illustrates an example user interface of adaptive supplemental content that moves responsive to detected movements of a user's face in an outgoing video stream in accordance with one or more implementations.
Figure 14:
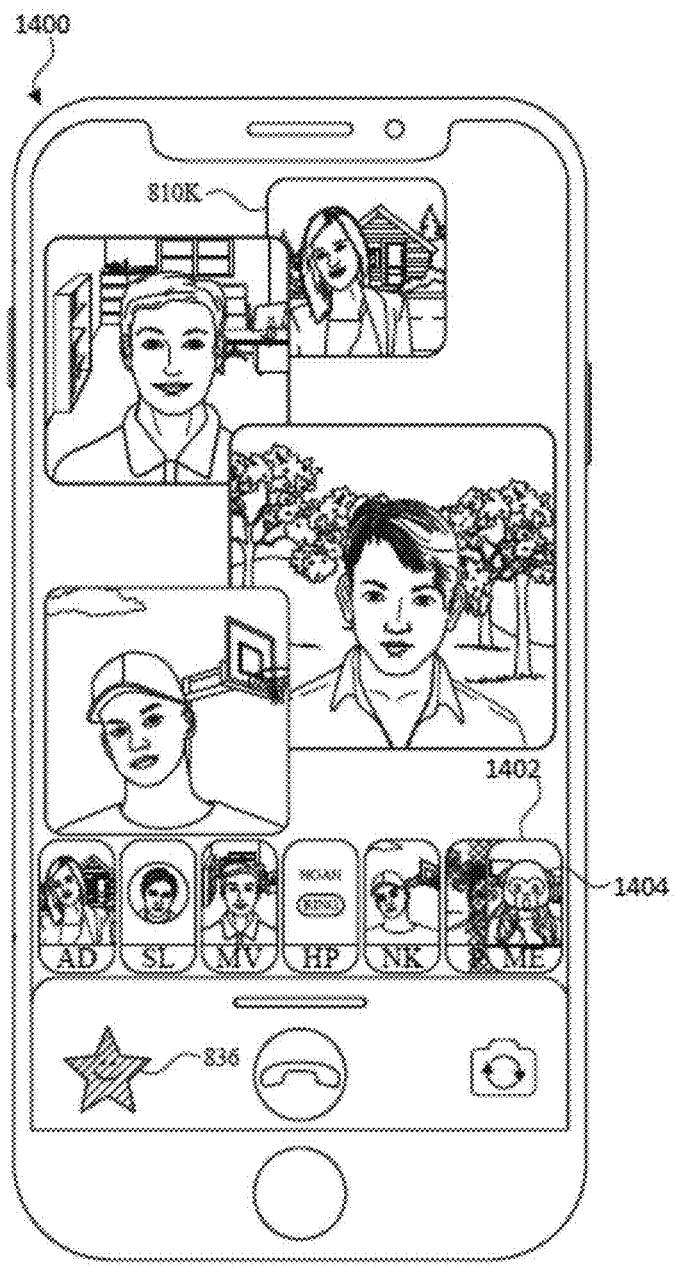
FIG. 14 illustrates an example user interface of a reduction in size of a video stream view showing an outgoing video stream with supplemental content in accordance with one or more implementations.
Figure 15:
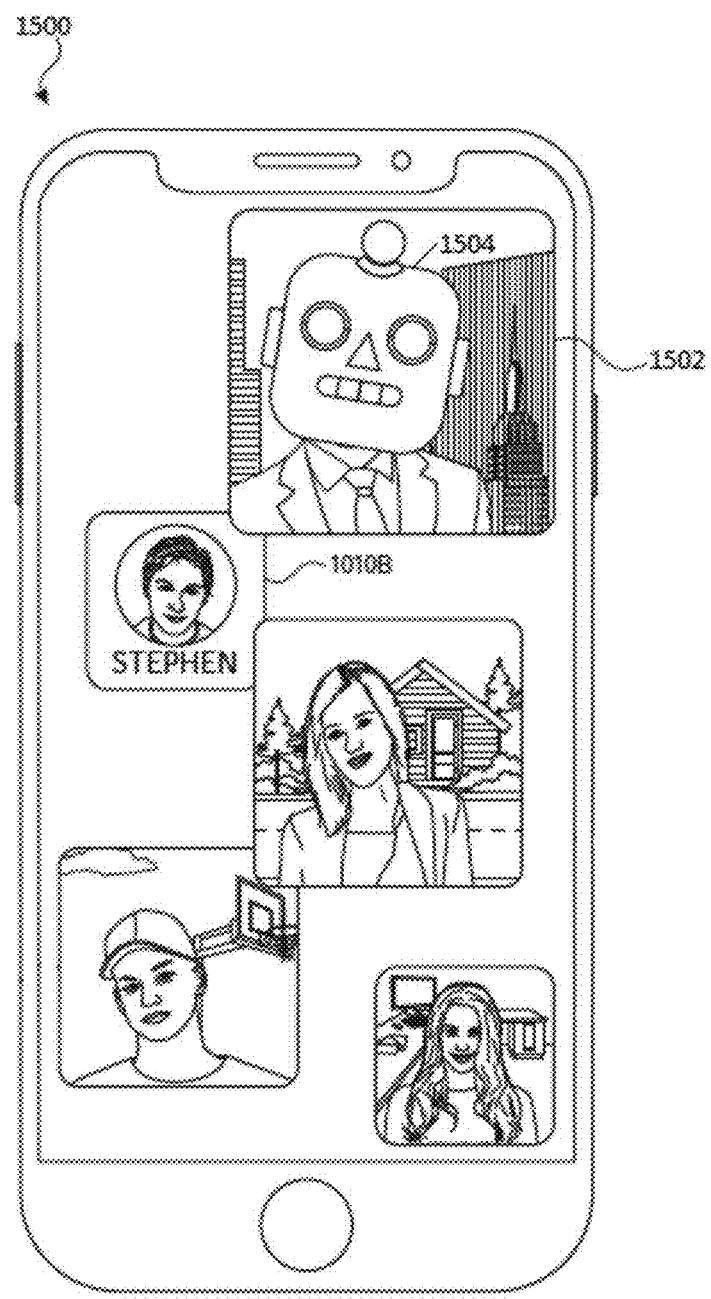
FIG. 15 illustrates an example user interface of an incoming video stream that includes supplemental content in accordance with one or more implementations.

The user interfaces described herein (see, e.g., FIGS. 2, 6, and 8) may utilize one or more elements (or the entirety) of one or more of the user interfaces illustrated in FIGS. 10-15. For example, the user interface 1000 of FIG. 10 illustrates an outgoing video stream 221 (see, e.g., element 1002 of FIG. 10) and several incoming video streams 223 (see, e.g., elements 1004, 1006, 1108 and 1010 of FIG. 10), together with a supplemental content mode option 208 represented as a star with a happy face (see, e.g., element 1012). As another example, the element 1102 of the user interface 1100 in FIG. 11 may represent a display of an outgoing video stream with supplemental content options 222 (represented as elements 1104, 1106 and 1108 of FIG. 11). As another example, the user interface 1200 of FIG. 12 illustrates an outgoing video stream 221 with supplemental content 229 (see, e.g., a monkey face 1202) added to the outgoing video stream responsive to selection of supplemental content option 1204 of FIG. 12. As another example, the user interface 1300 of FIG. 13 may illustrate adaptive supplemental content (see, e.g., a monkey face 1302) that moves (relative to the orientation shown in FIG. 13) responsive to detected movements of the user's face in the outgoing video stream. As another example, the user interface 1400 of FIG. 14 may illustrate a reduction in size of the video stream view showing outgoing video stream 221 (see, e.g., element 1402) with supplemental content 229 (see, e.g., element 1404). As another example, the user interface 1500 of FIG. 15 may illustrate an incoming video stream (see, e.g., element 1502) that includes supplemental content (e.g., a robot head 1504 over the remote user's face). In one aspect of the disclosure, the elements recited in FIGS. 10-15 may be presented by one or more of electronic device 115, electronic device 110, and/or server 120. FIGS. 10-15 may present elements of various steps, operations or processes in a sample order, and are not meant to be limited to the specific order or hierarchy presented.

Figure 16:
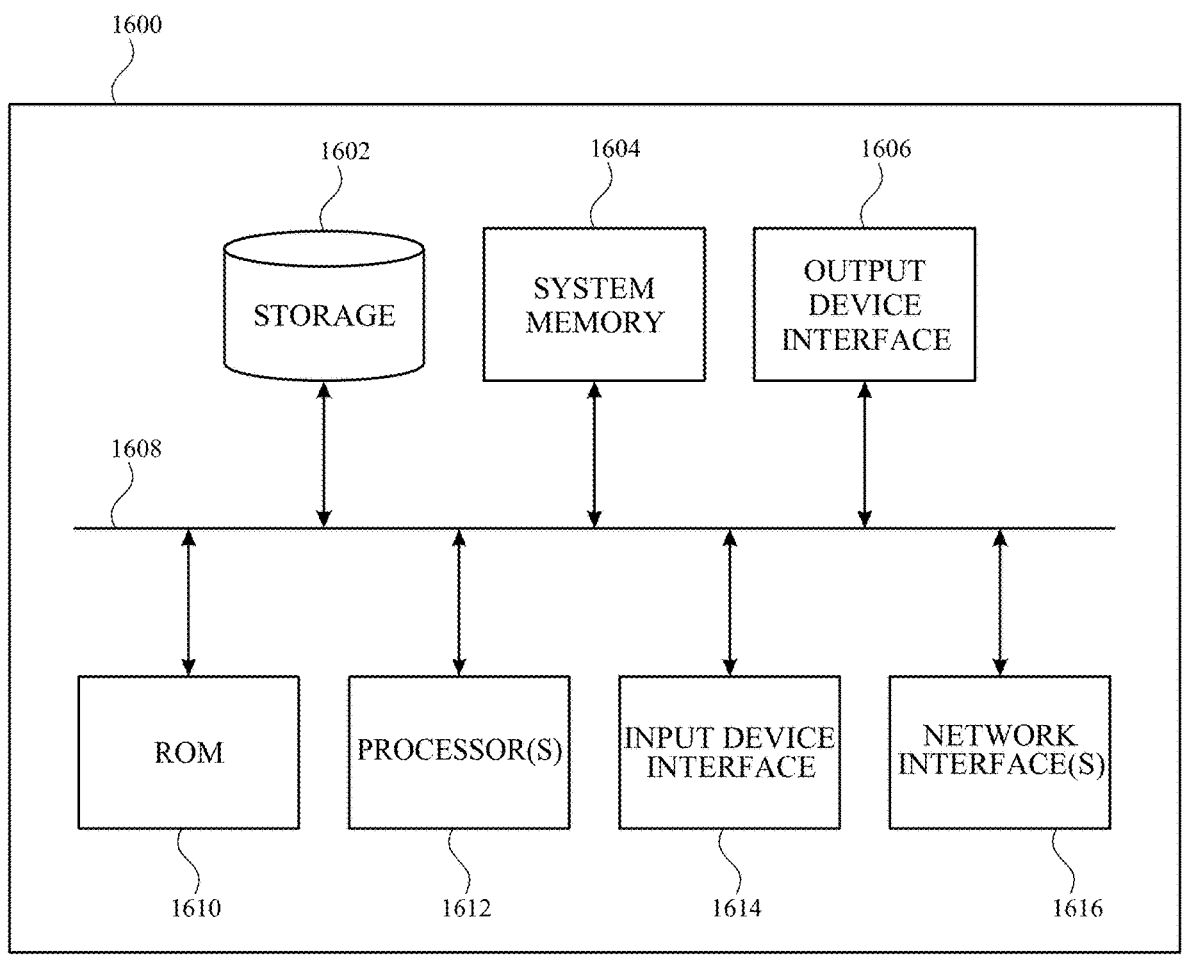
FIG. 16 illustrates an electronic system with which one or more implementations of the subject technology may be implemented.

FIG. 16 illustrates an electronic system 1600 with which one or more implementations of the subject technology may be implemented. The electronic system 1600 can be, and/or can be a part of, the electronic device 110, the electronic device 115, and/or the server 120 shown in FIG. 1. The electronic system 1600 may include various types of computer readable media and interfaces for various other types of computer readable media. The electronic system 1600 includes a bus 1608, one or more processing unit(s) 1612, a system memory 1604 (and/or buffer), a ROM 1610, a permanent storage device 1602, an input device interface 1614, an output device interface 1606, and one or more network interfaces 1616, or subsets and variations thereof.

The bus 1608 collectively represents all system, peripheral, and chipset buses that communicatively connect the numerous internal devices of the electronic system 1600. In one or more implementations, the bus 1608 communicatively connects the one or more processing unit(s) 1612 with the ROM 1610, the system memory 1604, and the permanent storage device 1602. From these various memory units, the one or more processing unit(s) 1612 retrieves instructions to execute and data to process in order to execute the processes of the subject disclosure. The one or more processing unit(s) 1612 can be a single processor or a multi-core processor in different implementations.

The ROM 1610 stores static data and instructions that are needed by the one or more processing unit(s) 1612 and other modules of the electronic system 1600. The permanent storage device 1602, on the other hand, may be a read-and-write memory device. The permanent storage device 1602 may be a non-volatile memory unit that stores instructions and data even when the electronic system 1600 is off. In one or more implementations, a mass-storage device (such as a magnetic or optical disk and its corresponding disk drive) may be used as the permanent storage device 1602.

In one or more implementations, a removable storage device (such as a floppy disk, flash drive, and its corresponding disk drive) may be used as the permanent storage device 1602. Like the permanent storage device 1602, the system memory 1604 may be a read-and-write memory device. However, unlike the permanent storage device 1602, the system memory 1604 may be a volatile read-and-write memory, such as random access memory. The system memory 1604 may store any of the instructions and data that one or more processing unit(s) 1612 may need at runtime. In one or more implementations, the processes of the subject disclosure are stored in the system memory 1604, the permanent storage device 1602, and/or the ROM 1610.

From these various memory units, the one or more processing unit(s) 1612 retrieves instructions to execute and data to process in order to execute the processes of one or more implementations.

The bus 1608 also connects to the input and output device interfaces 1614 and 1606. The input device interface 1614 enables a user to communicate information and select commands to the electronic system 1600. Input devices that may be used with the input device interface 1614 may include, for example, alphanumeric keyboards and pointing devices (also called "cursor control devices"). The output device interface 1606 may enable, for example, the display of images generated by electronic system 1600. Output devices that may be used with the output device interface 1606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 16, the bus 1608 also couples the electronic system 1600 to one or more networks and/or to one or more network nodes, such as the electronic device 115 shown in FIG. 1, through the one or more network interface(s) 1616. In this manner, the electronic system 1600 can be a part of a network of computers (such as a LAN, a wide area network ("WAN"), or an Intranet, or a network of networks, such as the Internet. Any or all components of the electronic system 1600 can be used in conjunction with the subject disclosure.

In accordance with various aspects of the subject disclosure, a device is provided that includes a memory and at least one processor communicatively coupled to the memory and configured to establish a conferencing session between the device and a remote device, the conferencing session including at least one of: receiving an incoming video stream from the remote device, or transmitting an outgoing video stream from a camera of the device to the remote device. The at least one processor is also configured to provide, for display, a supplemental content option and at least one of the incoming video stream or the outgoing video stream. The at least one processor is also configured to receive a selection of the supplemental content option. The at least one processor is also configured to modify, responsive to the selection, at least one of the incoming video stream or the outgoing video stream with supplemental content associated with the selected supplemental content option In accordance with various aspects of the subject disclosure, a non-transitory computer-readable medium is provided that includes instructions, which when executed by at least one computing device, cause the at least one computing device to perform operations that include receiving a live incoming video stream and metadata associated with supplemental content for the live incoming video stream from a remote device. The live incoming video stream includes a stream of image frames captured by a camera of the remote device and immediately transmitted by the remote device after capture. The operations also include modifying the live incoming video stream, using the metadata, to include the supplemental content. The operations also include displaying the modified live incoming video stream with the supplemental content.

In accordance with various aspects of the subject disclosure, a method is provided that includes establishing a conferencing session between a local device and remote devices, the conferencing session including transmitting an outgoing video stream from a camera of the local device to each of the remote devices. The method also includes providing, for display at the local device, a supplemental content option and the outgoing video stream. The method also includes receiving a selection of the supplemental content option. The method also includes modifying, responsive to the selection, the outgoing video stream with supplemental content associated with the selected supplemental content option.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   detecting, while a video stream from a camera of a local device is being sent to one or more remote devices during a video conferencing session between the local device and the one or more remote devices, a face in the video stream from the camera of the local device;
   receiving, by the local device, a selection of adaptive facial modification content;
   adding the selected adaptive facial modification content to the video stream to replace the detected face in the video stream;
   detecting changes in the detected face while the detected face in the video stream is replaced by the selected adaptive facial modification content;
   adapting the selected adaptive facial modification content to the changes in the detected face;
   integrating the video stream with the adaptive facial modification content to form an integrated modified video stream; and
   sending the integrated modified video stream to the one or more remote devices during the video conferencing session.

2. The method of claim 1, wherein the video stream includes a stream of image frames each having pixel values, and wherein integrating the video stream with the adaptive facial modification content includes integrating supplemental content values corresponding to the adaptive facial modification content into the pixel values based at least in part on depth information obtained from a sensor of the local device.

3. The method of claim 2, wherein integrating the supplemental content values into the pixel values includes adding the supplemental content values for the adaptive facial modification content to at least some of the pixel values of at least some of the image frames.

4. The method of claim 2, wherein integrating the supplemental content values into the pixel values includes replacing at least some of the pixel values of at least some of the image frames with the supplemental content values.

5. The method of claim 1, further comprising providing the integrated modified video stream from a video conferencing application that generates the adaptive facial modification content to an encoder of the local device for encoding of the integrated modified video stream for transmission to the one or more remote devices.

6. The method of claim 1, wherein integrating the video stream and the adaptive facial modification content includes providing the video stream and the adaptive facial modification content to an encoder of the local device for integration and encoding.

7. The method of claim 1, wherein sending the integrated modified video stream includes sending the integrated modified video stream while continuing to generate additional adaptive facial modification content for the video stream during the video conferencing session between the local device and the one or more remote devices.

8. The method of claim 1, wherein sending the integrated modified video stream includes sending the integrated modified video stream without supplemental content metadata that describes the adaptive facial modification content as separate from the video stream.

9. The method of claim 1, further comprising receiving the integrated modified video stream at the one or more remote devices, and decoding and displaying the integrated modified video stream without further modifying the integrated modified video stream.

10. The method of claim 1, further comprising detecting the changes in the detected face using a sensor of the local device.

11. The method of claim 1, wherein the adaptive facial modification content adapts to changes in the detected face by adapting to changes in a facial expression of the detected face.

12. The method of claim 1, wherein the one or more remote devices comprise first and second remote devices, and wherein sending the integrated modified video stream comprises sending the integrated modified video stream concurrently to both of the first and second remote devices during the video conferencing session.

13. The method of claim 12, wherein the one or more remote devices further comprises a third remote device, and wherein the method further comprises sending the video stream and supplemental content metadata for the adaptive facial modification content to the third remote device concurrently with sending the integrated modified video stream to both of the first and second remote devices during the video conferencing session, wherein the supplemental content metadata comprises instructions for obtaining and rendering the adaptive facial modification at the third remote device.

14. The method of claim 13, further comprising:
receiving, at the local device during the video conferencing session, first, second, and third respective incoming video streams from the first, second, and third remote devices; and
displaying, at the local device, the first, second, and third respective incoming video streams together with the video stream modified with the adaptive facial modification content.

15. The method of claim 14, wherein the first incoming video stream comprises first additional adaptive facial modification content integrated into the first incoming video stream, and the third incoming video stream comprises additional supplemental content metadata for second additional adaptive facial modification content to be displayed in combination with the third incoming video stream.

16. A non-transitory computer-readable medium storing instructions which, when executed by one or more processors, cause the one or more processors to:
detect, while a video stream from a camera of a local device is being sent to one or more remote devices during a video conferencing session between the local device and the one or more remote devices, a face in the video stream from the camera of the local device;
receive, by the local device, a selection of adaptive facial modification content;
add the selected adaptive facial modification content to the video stream to replace the detected face in the video stream;
detect changes in the detected face while the detected face in the video stream is replaced by the selected adaptive facial modification content;
adapt the selected adaptive facial modification content to the changes in the detected face;
integrate the video stream with the adaptive facial modification content to form an integrated modified video stream; and
send the integrated modified video stream to the one or more remote devices during the video conferencing session.

17. The non-transitory computer-readable medium of claim 16, wherein the video stream includes a stream of image frames each having pixel values, and wherein integrating the video stream with the adaptive facial modification content includes integrating supplemental content values corresponding to the adaptive facial modification content into the pixel values.

18. The non-transitory computer-readable medium of claim 17, wherein integrating the supplemental content values into the pixel values includes adding the supplemental content values for the adaptive facial modification to at least some of the pixel values of at least some of the image frames.

19. The non-transitory computer-readable medium of claim 17, wherein integrating the supplemental content values into the pixel values includes replacing at least some of the pixel values of at least some of the image frames with the supplemental content values.

20. The non-transitory computer-readable medium of claim 16, wherein the instructions, when executed by the one or more processors, further cause the one or more processors to provide the integrated modified video stream from a video conferencing application that generates the adaptive facial modification content to an encoder of the local device for encoding of the integrated modified video stream for transmission to the one or more remote devices.

21. The non-transitory computer-readable medium of claim 16, wherein integrating the video stream and the adaptive facial modification content includes providing the video stream and the adaptive facial modification content to an encoder of the local device for integration and encoding.

22. A device, comprising:
a camera;
memory; and
one or more processors configured to:
detect, while a video stream from a camera of the device is being sent to one or more remote devices during a video conferencing session between the device and the one or more remote devices, a face in the video stream from the camera of the device;
receive a selection of adaptive facial modification content;
add the selected adaptive facial modification content to the video stream to replace the detected face in the video stream;
detect changes in the detected face while the detected face in the video stream is replaced by the selected adaptive facial modification content;
adapt the selected adaptive facial modification content to the changes in the detected face;
integrate the video stream with the adaptive facial modification content to form an integrated modified video stream; and
send the integrated modified video stream to the one or more remote devices during the video conferencing session.

23. The device of claim 22, wherein the one or more processors are configured to send the integrated modified video stream by sending the integrated modified video stream while continuing to generate additional adaptive facial modification content for the video stream during the video conferencing session between the device and the one or more remote devices.

24. The device of claim 22, wherein the one or more processors are configured to send the integrated modified video stream by sending the integrated modified video stream without supplemental content metadata that describes the adaptive facial modification content as separate from the video stream.

25. The device of claim 22, further comprising a sensor configured to detect the changes in the detected face.

* * * * *

UNITED STATES PATENT AND TRADEMARK OFFICE
CERTIFICATE OF CORRECTION

PATENT NO. : 11,889,229 B2
APPLICATION NO. : 16/867466
DATED : January 30, 2024
INVENTOR(S) : Christopher M. Garrido et al.

It is certified that error appears in the above-identified patent and that said Letters Patent is hereby corrected as shown below:

On the Title Page

Page 2; Column 2; Line 8:
(56) References Cited; under FOREIGN PATENT DOCUMENTS:
Below JP 2003-016475 A 1/2003, Insert --JP 2005-018305 A 1/2005--.

Signed and Sealed this
Twenty-third Day of April, 2024

Katherine Kelly Vidal
*Director of the United States Patent and Trademark Office*